US011034044B2

(12) United States Patent
Völkl et al.

(10) Patent No.: US 11,034,044 B2
(45) Date of Patent: Jun. 15, 2021

(54) CUTTING DEVICE AND CUTTING PROCESS

(71) Applicant: TVI Entwicklung & Produktion GmbH, Irschenberg (DE)

(72) Inventors: Thomas Völkl, Bruckmühl (DE); Martin Mayr, Eiselfing (DE)

(73) Assignee: TVI ENTWICKLUNG & PRODUKTION GMBH, Irschenberg (DE)

(*) Notice: Subject to any disclaimer, the term of this patent is extended or adjusted under 35 U.S.C. 154(b) by 53 days.

(21) Appl. No.: 15/995,449

(22) Filed: Jun. 1, 2018

(65) Prior Publication Data

US 2018/0345519 A1 Dec. 6, 2018

(30) Foreign Application Priority Data

Jun. 2, 2017 (DE) .......................... 102017112178.1

(51) Int. Cl.
*B26D 1/00* (2006.01)
*A22C 17/00* (2006.01)
*B26D 3/16* (2006.01)
*B26D 7/01* (2006.01)
*B26D 7/26* (2006.01)

(52) U.S. Cl.
CPC .......... *B26D 7/2635* (2013.01); *A22C 17/002* (2013.01); *B26D 1/0006* (2013.01);
(Continued)

(58) Field of Classification Search
CPC .. B26D 7/2635; B26D 3/161; B26D 2210/02; B26D 1/006; B26D 7/01;
(Continued)

(56) References Cited

U.S. PATENT DOCUMENTS

| 4,273,013 A * | 6/1981 | Artin ........................ B26D 1/15 83/167 |
| 7,882,774 B1 * | 2/2011 | Bernardy ................ B26B 25/00 83/835 |

(Continued)

FOREIGN PATENT DOCUMENTS

| DE | 3020900 A1 | 12/1980 |
| DE | 4310832 A1 | 10/1994 |

(Continued)

OTHER PUBLICATIONS

European Search Report dated Nov. 9, 2018, Applicant No. 18175476. 3-1016, Applicant TVE Entwicklung und Produktion GmbH, 6 Pages.

*Primary Examiner* — Ghassem Alie
(74) *Attorney, Agent, or Firm* — Brooks Kushman P.C.

(57) ABSTRACT

The rotating shaped blade for cutting slides from a product strand is only configured over a portion of its outer edge as a circular segment that extends about the rotation axis and which represents the cutting edge so that on the one hand side the cutting edge has a constant width radial distance from a circular segment shaped functional edge of the stop plate over an entire extension of the circular segment, and on the other hand side immediately after releasing the strand cross section by the blade a forward movement of the product strand can be performed up to the stop plate until the radial front edge of the blade has reached the strand cross section again.

24 Claims, 16 Drawing Sheets

(52) U.S. Cl.
CPC ............... *B26D 3/161* (2013.01); *B26D 7/01* (2013.01); *B26D 2001/006* (2013.01); *B26D 2001/0046* (2013.01); *B26D 2001/0053* (2013.01); *B26D 2210/02* (2013.01)

(58) Field of Classification Search
CPC .... B26D 2001/0053; B26D 2001/0046; B26D 1/143; B26D 7/0616; B26D 7/0608; B26D 1/12; B26D 3/11; A22C 17/002; Y10T 83/7709; Y10T 83/9403; Y10T 83/8791; Y10T 83/501; A47J 43/0711
USPC .... 83/13, 835, 474, 676, 62.1, 865, 105, 74, 83/522, 155, 356.3, 592, 932; 99/537, 99/491, 538; 426/231; 241/282.2, 92
See application file for complete search history.

(56) References Cited

U.S. PATENT DOCUMENTS

| | | | | |
|---|---|---|---|---|
| 2002/0059858 A1* | 5/2002 | Lindee | .................. | B26D 3/161 83/676 |
| 2009/0013540 A1* | 1/2009 | Bohne | .................. | B27B 19/006 30/388 |
| 2011/0056356 A1* | 3/2011 | Koch | .................. | B26D 7/0616 83/471 |
| 2012/0144676 A1* | 6/2012 | Davidian | .................. | B25F 3/00 30/142 |
| 2014/0345434 A1* | 11/2014 | Scattolin | .............. | B26D 1/0006 83/676 |
| 2015/0158194 A1* | 6/2015 | Krauss | ................ | B26D 1/0006 83/13 |
| 2015/0328793 A1* | 11/2015 | Muller | ................ | B26D 1/0006 83/13 |
| 2017/0312931 A1* | 11/2017 | Volkl | ....................... | B26D 5/06 |

FOREIGN PATENT DOCUMENTS

| | | |
|---|---|---|
| DE | 29807977 U1 | 8/1998 |
| DE | 198 23 413 A1 | 12/1999 |
| DE | 102010035657 A1 | 9/2011 |
| DE | 102010035656 A1 | 3/2012 |
| WO | 9908844 A1 | 2/1999 |

* cited by examiner

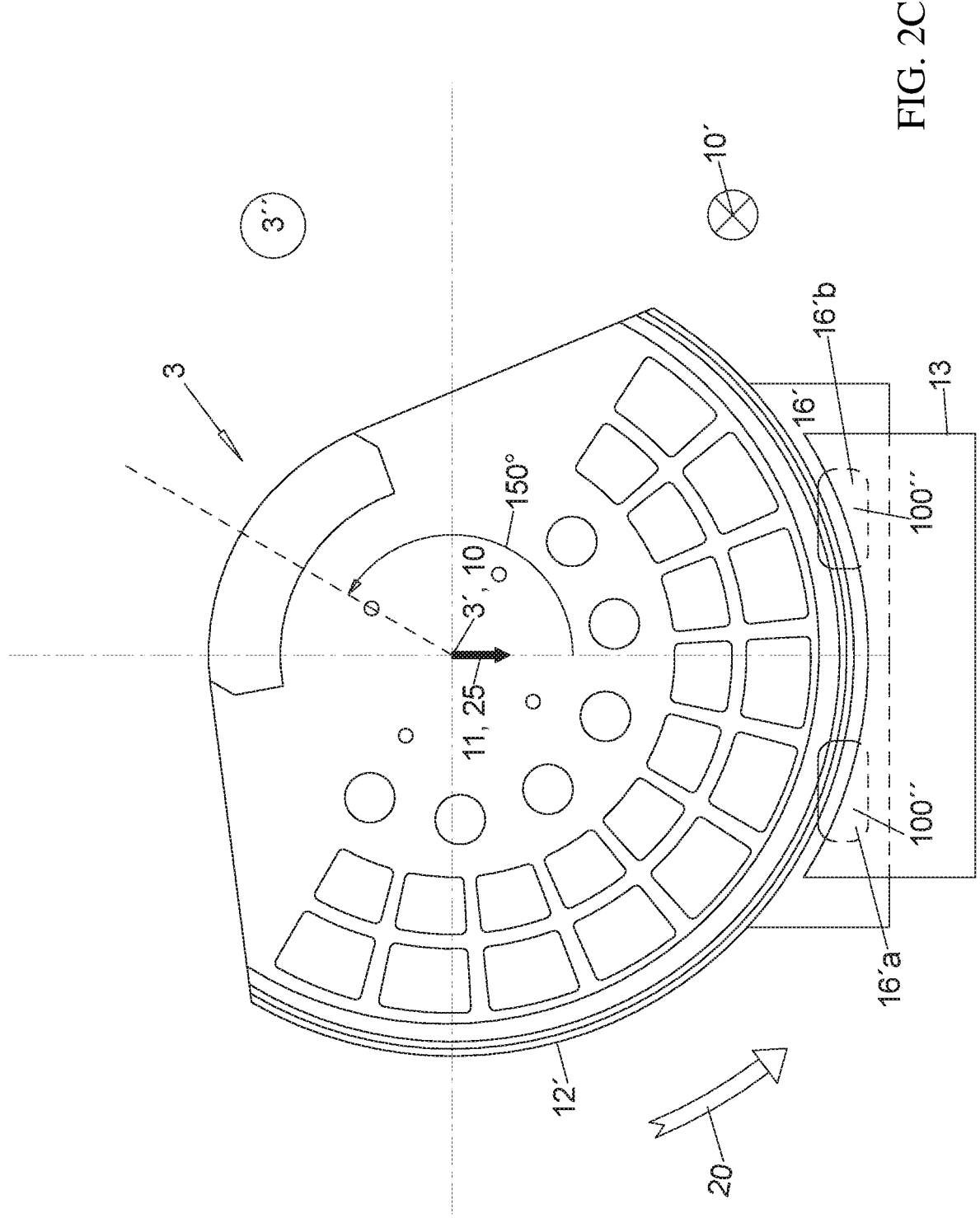

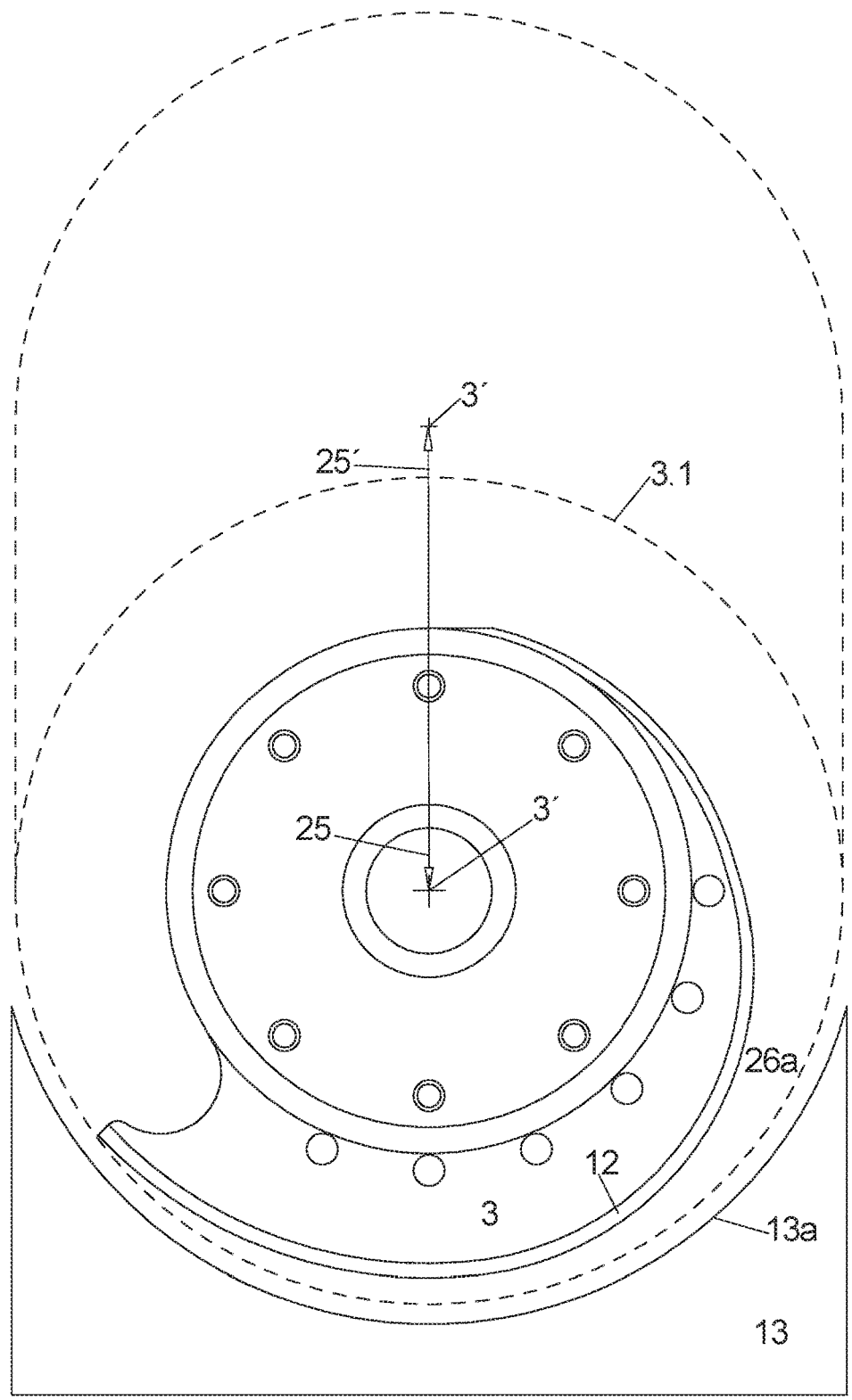
FIG. 5-
Prior Art

CUTTING DEVICE AND CUTTING PROCESS

I. FIELD OF THE INVENTION

The invention relates to a cutting unit for cutting slices from a typically strand-shaped base product, thus a food strand like, e.g., a sausage strand or cheese strand, typically with a cross-section that is constant over a length of the strand or a fresh meat strand than typically with a cross-section that is variable over its length.

II. BACKGROUND OF THE INVENTION

Thus a blade is moved transversally to the longitudinal orientation of the strand through a cross-section of the strand and a slice is cut off and before cutting off the next slice, the strand is pushed in the longitudinal direction past the blade along a contact surface or along a tube or a form tube, in particular when the strand has an uneven cross-section either up to a stop on a side of the blade that is opposite with respect to the main portion of the strand or the strand is held at a rear end and moved forward in a controlled manner by a feed amount.

In order to increase efficiency of the cutting device, it is advantageous when the strand can be moved forward with a minimum time delay after completing cutting off the slice so that the strand reaches its cut off position. The timespan, thus the cycle between two cutting processes can be kept very short without problems.

Thus, different blade shapes can be used in order to respectively achieve a pulling cut wherein the blade shapes, however, have different pros and cons with respect to the point and time when the cutting of the strand can be commenced.

Strip-shaped or bar-shaped in particular straight blades which are moved for the cutting in their longitudinal orientation typically have a small width in the penetration direction into the strand for reason of width, wherein the width is smaller than the cross-section of the strand and then have to be moved at least with their dull rear edge away from the face of the remaining strand in order to move back after the cutting process is finished so that the rear edge does not scrape along the face.

Even for a sufficient width, thus a width that is greater than the cross-section of the strand in order to prevent a smearing of the backside of the blade as well as of the front face of the strand.

Circular disk-shaped blades that rotate about their central axis initially have to be offset with their axis at least by the radius of the blade from the edge of the cross section of the strand in the transversal direction in order to be able to commence moving the strand forward.

For the same reasons that apply for a bar-shaped or strip-shaped blade, it is helpful to additionally lift the blade from the strand in the longitudinal direction after the cutting process has been completed.

Sickle-shaped blades which taper in particular into a point at their free end quickly move out from the overlap with the cross-section of the strand after completing the cutoff process and continuing to rotate, however, using them together with a stop plate for the strand has its disadvantages.

Namely, in the longitudinal direction a gap shall be provided between the outer circumference of the blade and the concave functional edge of the stop plate wherein the gap shall have uniform width along the course of the functional edge.

For a sickle-shaped blade where a radius of its cutting edge increases towards the rotation axis of the blade along the cutting edge this can only be achieved when the contact plate is pivoted together with the sickle blade at least during the cutting process viewed in the longitudinal direction but wherein the contact plate does not rotate together with the sickle blade in order to service as a stop for the advanced strand between an end of the first cutting process and the beginning of the second cutting process.

This, however, requires a complicated mechanical configuration.

III. BRIEF SUMMARY OF THE INVENTION a) Technical Object

Thus, it is an object of the invention to provide a cutting device with a blade of the type recited supra and in particular a split plate so that idle times between two cutting processes are kept to a minimum. The invention also relates to a method using the device.

b) Solution

The object is achieved by the features of claims 1 and 23. Advantageous embodiments can be derived from the dependent claims.

A cutting unit of the generic type described supra for cutting slices from a product strand includes a blade that is rotatable about a rotation axis, in particular a plate-shaped blade, whose outer edge, thus a circumference of the blade or of the plate, is configured as a cutting edge that radially tapers into a point over a cutting edge portion and which is typically ground only from one side of the plate.

A rotating blade of this type penetrates in transversal direction into the product strand for cutting off a slice and is offset backward from a front end of the product strand by an intended thickness of the slice and runs through an entirety of the strand so that a slice is cut off.

After moving back into the starting position another slice can be cut off.

According to the invention, the cutting edge portion that is configured as a cutting edge and whose circumferential extension is less than 360 degrees, extends at least partially as a circular segment whose curvature center is the rotation axis of the blade viewed in the axial direction thus in the direction of the rotation axis of the blade.

Advantageously the remainder of the circumference remote from the cutting edge portion of the in particular plate-shaped blade, the residual edge portion does not protrude beyond the throwing circle of the circular segment of the cutting edge portion but is arranged within, in particular exclusively within, the throwing circle.

In particular no portion of the cutting edge portion, in particular not the non-circular segment-shaped portion, protrudes outside of the throwing circle but is advantageously arranged within the throwing circle.

Thus, the portion of the cutting edge portion that is configured as the circular segment protrudes radially the most from the rotation axis. This facilitates particularly efficient and time-saving motion processes of the cutting unit when cutting the strands into slices as will be described infra.

A portion of the cutting edge portion, in particular both end portions or advantageously only the end portion of the cutting edge portion that is in front in the rotation direction, extends from the circular segment radially further inward and is in particular cambered with a smaller curvature radius than the circular segment.

In an advantageous embodiment this smaller curvature radius decreases towards an end of the cutting edge portion.

This facilitates a penetration of the blade into the strand and can also be performed only at a smaller distance between the rotation axis of the blade and the cross section of the strand, than for a cutting edge portion that is configured over an entire length as a circular segment.

Advantageously the cutting edge portion, in particular the circular segment-shaped portion included therein, extends over a circumferential range of at least 100 degrees, better at least 130 degrees, better at least 150 degrees, better at least 180 degrees, with respect to the rotation axis.

In particular the cutting edge portion, in particular its portion that is configured as a circular segment, extends over a circumferential range of 280 degrees at the most, better 250 degrees at the most, better 200 degrees at the most, better 180 at the most with respect to the rotation axis.

This has proven to be an optimum for many ratios between diameter of the throwing circle and a largest cross-sectional section of the product strand.

Typically, a radius of the throwing circle should have at least twice the size, better three times the size, better four times the size as a largest cross-sectional section of the product strand to be cut up.

It has also proven advantageous when a smallest radial distance of the circumference of the in particular plate-shaped blade, thus of the remaining edge portion, from the rotation axis is 80% at the most, better 70% at the most, better 60% at the most, better 50% at the most, better 40% at the most of the radius of the circular segment. A size of this recess of the residual edge portion from the throwing circle determines the processes that are possible for cutting up the strand.

A radial distance of the remaining edge portion from the rotation axis decreases advantageously from an end of the cutting edge portion, in particular, decreases continuously until a circumferential point of the blade is reached which has the smallest distance from the rotation axis.

Advantageously the blade is symmetrical to a diameter line that extends through a center of the circular segment or a center of the cutting edge portion viewed in the axial direction wherein the diameter line then forms the symmetry line.

Alternatively, the circumference of the blade can be also configured non-symmetrical, in particular so that starting with the operationally forward end in a rotation direction of the cutting edge portion the remaining cutting portion is reduced in distance from the rotation axis more slowly per degree of angle, than starting at the rear end of the cutting edge portion against the direction of rotation. In particular the profile of the remaining edge portion can have a partially radial orientation, or it can cut a radial orientation even two times or more often.

Still the blade should have the same centrifugal force in rotation condition in both opposite radial directions along the symmetry line extending through the rotation axis or along the diameter line that extends through the center of the circular segment or of the cutting edge portion.

For this purpose the blade viewed in the axial direction can have a portion with a higher surface weight compared to the remainder of the blade along the blade plane outside of the circular segment of the cutting edge portion, thus in the segment of the remaining edge portion, wherein the surface weight in this partial area is increased compared to the rest of the blade advantageously by at least 100%, better at least 200%, better at least 300%, better at least 400%, in particular increased so that this portion is sided and arranged so that the recited condition of identically-sized opposite centrifugal forces is achieved. Same size means in this context a deviation of the larger value by not more than 5% compared to the smaller value.

Advantageously the base element of the blade is made from a plate with identical thickness of the place at least over more than half the portion of the surface of the blade and the portion with increased surface weight is achieved in particular by an additional weight that is arranged at the plate-shaped blade base element, which is positioned in particular within the circumference of the blade base element, in particular by more than 80%, better by more than 90%.

Alternatively, the blade can be produced internally in one piece and comply with the condition of opposing balanced centrifugal forces along the symmetry line by a variation of the thickness in various portions, which however, causes increased material consumption when producing the blade.

Typically, the cutting unit includes a base frame at which the blade is moveable arranged, in particular so that it is rotatable about its rotation axis.

Advantageously the cutting unit also includes a stop plate which is attached stationary at the base frame with respect to the rotation direction of the blade and which extends view in the axial direction advantageously radially outside of, in particular entirely radially outside of, the throwing circle of the cutting edge portion of the blade.

The stop blade serves as a stop for the front face of the product strand before cutting off the next slice and is arranged on an opposite side of the product strand with respect to the blade plane.

For a cutting edge that is only ground from one of the main sides of the blade, the blade plane is the main surface of the blade which is not ground but otherwise orthogonal to the rotation axis wherein the blade plane runs through the cutting edge tip of the cross section of the blade edge, thus the cutting edge.

The blade and the stop plate can be a component of the cutting unit frame instead of a respective direct attachment at the base frame wherein the cutting unit frame is movably attached at the base frame, in particular movable in the radial direction with respect to the rotation axis of the blade.

The stop plate can be arranged with respect to the rotation axis of the blade radially movable either at the cutting unit frame or directly at the base frame and can thus be arranged in particular so that it is movable in a controlled manner so that a radial relative movement between the stop plate and the blade is also possible during operations of the cutting unit. Thus, the cutting gap viewed in the axial direction through which the slice that is to be cut off has to exit can be controlled with respect to its size between the stop plate and the blade.

For this purpose, the circumferential portion of the stop plate that is oriented towards the rotation axis of the blade, the so-called functional edge, is configured concave, in particular as a concave circular segment.

In an advantageous embodiment the concave circular segment of the stop plate has a curvature radius that is identical to or at the most 20% greater, better at the most 10% greater, better at the most 5% greater than the curvature radius of the blade, in particular a larger curvature radius. Advantageously the curvature center of the convex circular segment of the blade and of the concave circular segment shape functional edge of the stop edge are identical.

The stop plate is adjustable with respect to the rotation axis of the blade in the transversal direction, in particular in a radial direction relative to the rotation axis at least before and after the cutting operation of the cutting unit, advantageously however also during operations of the cutting unit and in particular variable while the cutting edge passes through the cross section of the product strand.

A control of this type which controls at least all movable parts of the cutting unit has to be configured accordingly. Thus, it is possible on the one hand side to adjust the slice thickness during cutting operations and on the other hand side to vary the radial distance between the blade and the stop plate during each cutting process, in particular increase the radial distance towards an end of the cutting process.

Advantageously the cutting unit also includes a strand support for feeding the product strand to be cut up and in particular a strand drive for moving the product strand along the strand support towards the blade in the feed direction.

Advantageously the strand support and/or the strand drive is also attached at the base frame which also supports the blade and optionally the stop plate or which carries the cutting frame that includes both elements.

The strand support includes at least one contact surface for the product strand to be cut up, in particular a tub-shaped contact surface and advantageously viewed in axial direction a circumferentially closed support tube which is filled by the product strand in the cross-section advantageously completely, for example because the produce strand is pre-compressed in the support tube in the longitudinal and/or transversal direction.

Thus, it is assured that the product strand has a uniform cross sectional surface and cross sectional shape along its longitudinal section.

The strand support terminates with its axial end that is oriented forward in the feed direction thus oriented towards the blade shortly, in particular directly, in front of the blade on a side of the blade that is opposite to the stop plate.

In particular the provided axial distance between the blade and the strand support is kept as small as possible and is advantageously below 2 mm, better below 1 mm, better below 0.5 mm, in order to prevent an expansion of the cross section of the pressurized product strand in this portion.

The strand drive can be implemented in different ways.

A typical variant is a strand slide that is movable in a linear manner in the longitudinal direction of the strand support, the feed direction wherein the strand slide presses against a rear end of the product strand that is oriented away from the blade and presses the product strand after each cut against the contact surface oriented towards the product strand again.

It shall be clarified that in spite of the terms "stop plate" or "plate-shaped blade" this neither has to be a continuously closed plate nor does it have to have a flat contact surface and does not have to have an identical thickness from the contact surface to the other opposite main surface.

The strand slide has a cross section at its front end wherein the cross section substantially fills the cross section of the support tube at least 90% of it, better 95% of it, better 98% of it, better 99% of it, in particular when the support tube is considered as a filled tank.

The strand slide can also include grippers at a forward end that is oriented towards the blade and thus towards the rear end of the product strand in order to grip and retain the product strand, for example claws or points that extend transversal to the feed direction. Thus, the strand slide cannot only push the product strand forward in the feed direction but can also retain it so that the product strand is not additionally pulled forward in an undesirable manner in the feed direction by other influences like, e.g., adhesion at the blade.

Viewed in the longitudinal direction of the strand support, wherein the feed direction advantageously coincides with the direction of the rotation axis of the blade or deviates therefrom by 15 degrees at the most, better by 5 degrees at eh most, better by 3 degrees at the most, the blade is arranged and movable in the transversal direction relative to the feed direction so that the plate-shaped blade depending on its position and/or instant position of its rotation axis Can cover the cross-section of the fed strand, in particular the cross section of the support tube, at least partially, in particular completely, and/or Does not overlap with this cross section of the fed product strand, in particular the cross section of the support tube.

Viewed in the longitudinal direction of the strand support, the feed direction, the stop plate is arranged and movable in the transversal direction relative to the feed direction so that the stop plate Can at least partially cover the cross section of the fed strand, in particular the cross section of the support tube in one cutting position, and/or Overlaps with this cross section at least partially, advantageously completely in one feed position.

Thus, the entire cutting process can be controlled so that, in particular when the blade and the stop plate are controllable independently from each other, in particular in the axial direction and/or in the transversal direction, so that a shape and weight precise cutting of slices is possible also for difficult materials of a product strand like density conditions, elasticity and similar, that vary in the product strand.

According to a cutting method for slices the product strand is moved forward beyond the blade plane by a defined amount, in particular moved forward to the stop plate after, in particular directly after, the radial rear edge in the rotation direction of the blade, in particular the rear limitation radius of the cutting edge portion, in particular of the circular segment of the cutting edge portion, has exited the cross-section of the product strand.

The advantage is that this can be commenced irrespective of the throwing circle of the blade viewed in the axial direction, still extending through the cross-section of the product strand, thus also when the rotation axis of the blade has not moved away from the cross-section of the product strand far enough so that the throwing circle does not intersect with the cross-section of the product strand anymore.

This way the feed motion of the product strand can be commenced earlier than for a circular rotating blade whose rotation axis is moved back and forth in a transversal direction to the product strand, the penetration and retraction direction, so that a dead period between two cutting processes is reduced.

For advancing the product strand until the stop plate is reached or for a predetermined axial position more time is available until the radial front edge of the blade in rotation direction, in particular the front limitation radius of the cutting edge portion, in particular of the circular segment, penetrates the cross section of the product strand again.

Another advantage is that the rotation axis of the blade has to be moved by a smaller distance away from the cross-section of the product strand, in particular from the cross section of the support tube during a radial backstroke, than for a circular disk-shaped blade which rotates about an axis which extends through a center of its cross-section.

c) Embodiments of the Invention

Embodiments of the invention are subsequently described with reference to drawing figures wherein:

FIG. 2a-2h illustrates a cutting unit with blade stop plate and form tube in different rotation and penetration positions of the blade viewed in the axial direction of the blade;

FIG. 5 illustrates a known embodiment of a rotating blade with stop plate viewed in the axial direction;

FIG. 5 illustrates a rotating so called cycle blade together with a stop plate 13 that is known in the art in order to emphasize the basic problem of the invention.

Figure 1A:
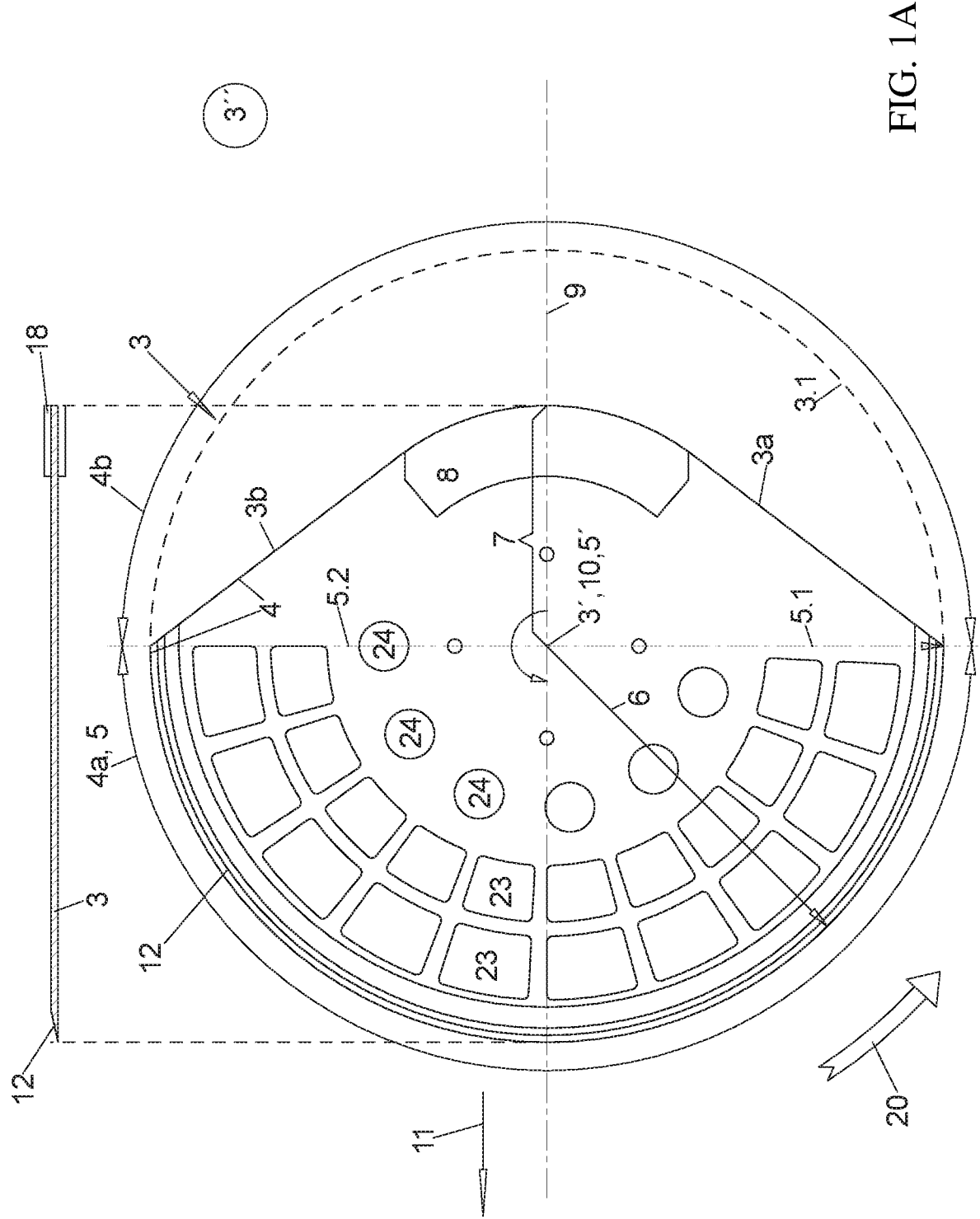
FIG. 1a illustrates a first embodiment of the rotating blade views in the rotation direction of the blade.

In a side blade of this type the circumferential portion of the blade 3 that is configured as a cutting edge 12 is not provided circular arc shaped about the rotation axis 3' of the blade 3 but it extends with a radius from the rotation axis 3' that continuously increased from a beginning to an end of the cutting edge.

In order to facilitate cutting off a slice and pushing the slice through the gap between the blade 3 and the stop plate 13 during cutting as illustrated in FIGS. 3a-3d the functional edge 13a of the stop plate 13 has to be shaped concave and extend approximate parallel to the throwing circle 3.1 of the cycle shaped blade 3.

This however has the effect that the radial gap 26a between the cutting edge 12 of the blade and the functional edge 13a of the stop plate 13 is rather small at a location of a largest cutting edge radius and becomes greater and greater in a direction of the decreasing cutting edge radius so that it reaches a size where the plastically deformable material of the product strand can already be pushed into the gap 26 before being cut off which is undesirable because the cut off slice 101 does not have the desired shape and dimensional precision.

In order to achieve a radial gap 26a with uniform width everywhere a blade with a circular segment shaped cutting edge is advantageous whose inherent disadvantages have to be compensated according to the invention as described supra.

FIG. 1a illustrates a first embodiment of a substantially plate shape blade 23a in a top view of the blade plane 3' and in a sectional view through the symmetry line 9 which extends through the rotation axis 3' of the blade 3.

As illustrated in FIG. 1a the blade 3 is advantageously configured laterally symmetrical thus mirror symmetrical to the symmetry line 9.

In the axial direction 10, the direction of the rotation axis 3' of the blade 3 the approximately plate shaped blade 3 has 2 different circumferential portions.

A portion of the circumference is configured as a circular segment 5 whose curvature center is the rotation axis 3' of the circular segment 5 which extends in this case over 180°, thus the forward defining radius 5.1 of the circular segment 5 is offset by 180° relative to the defining radius 5.2. Defining radius is a radius through the curvature center, the blade axis 3' which extends through the beginning or the end of the circular segment.

The outer edge 4 is configured as a cutting edge 12 that is tapered and pointed in a radially outward direction and in this case only ground on one side as illustrated in the sectional view of FIG. 1a. Therefore, this circular segment 5 is the cutting edge portion 4a of the outer edge 4, whereas the remainder, in this case also 180° of the outer edge 4 is the residual edge portion 4b which is not configured as a cutting edge.

In the entire residual edge portion 4b the outer edge 4 extends within the throwing circular 3.1 of the circular segment 5 which simultaneously forms the throwing circle of the blade 3 since the residual edge portion 4b does not protrude beyond the throwing circle.

From a beginning and from an end of the circular segment 5, the outer edge 4 recedes furthered and further from the throwing circle 3.1 with an increasing offset and circumferential direction and approaches the blade axis 3' so that typically on the summitry line 9 the smallest radial distance between the outer edge 4 and the blade axis 3 is provided which only amounts to 40-60% of the curvature radius 6 of the circular segment 5.

In this case the residual edge portion 4b as configured approximately triangular with a radial front edge 3a or radial rear edge 3b of the circular segment 5 that is oriented away from the circular segment 5 or the cutting edge portion 4a in a direction of the symmetry line 9 wherein the radial front edge or the radial rear edge are straight lines which form flanks of the triangular shape of the residual edge portion 4b.

In the residual edge portion 4b a portion 8 is illustrated in the residual edge portion 4b about the symmetry line 9, thus in a portion of a smallest radial distance about the plate shaped base element of the blade 3 which has a uniform thickness with the exception of the cutting edge 12 wherein the baled 3 has an increased surface area weight in the portion 8 in that an additional weight 18, e.g. made from a tungsten plate is applied in this portion on at least one of the two sides of the plate shaped base element of the blade.

On a main surface of the blade 3 that is oriented away from the meat strand in particular on the connected side recesses 23 are illustrated in the cutting edge portion 4a radially within the cutting edge 12 wherein the recesses do not penetrate the blade 3 but are only used for weight reduction of the blade 3 and furthermore pass through bore holes are provided which are advantageously arranged radially further inside than the recesses 23 and which are primarily used for weight reduction but also for balancing the blade 3 which shall produce identical centrifugal forces during a rotation about the rotation axis 3 in both radial directions along the symmetry line 9.

The recesses 23 as well as the pass through bore holes 24 are advantageously arranged on a circular arc about the rotation axis 3'.

Figure 1B:
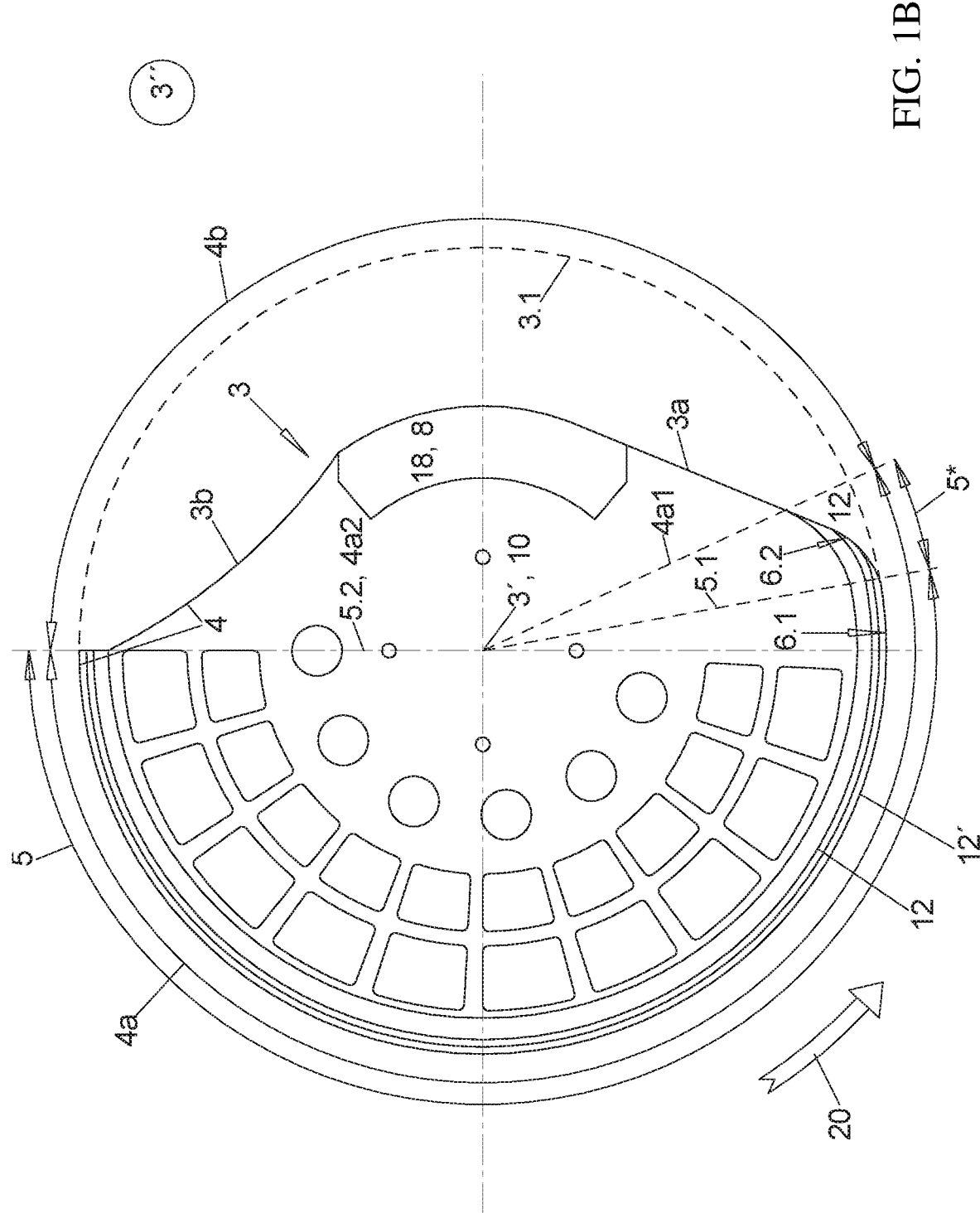
FIG. 1b illustrates a second embodiment of the blade in the same view.

FIG. 1b illustrates a second embodiment of the blade 3 which is not symmetrical to any line of the blade axis 3'.

First of all it is evident that the circular segment 5 extends over more than 180° in particular however that the cutting edge portion 4a that is configured as the cutting edge 12 covers a greater angle than the circular segment 5.

This is caused by the fact that an additional angular segment, the initial cutting portion 5* is configured as a blade 12 between the circular segment 5 and the radial front edge 3a of the residual edge portion 4b and in the rotation direction 20 wherein the radial front edge 3a refers to operations of the blade 3, however the curvature radius 6.2 of the blade 12 is much less than the curvature radius of the circular segment 5 and therefore the blade 12 already recedes in radially inward direction from the throwing circle 3.1 in this initial cutting portion 5*.

Thus, the radial front edge 3a of the cutting edge portion 4a which is part of the residual edge portion extends as a straight line from the throwing circle 3 and recedes increasingly in a direction toward a center of the residual edge portion 3b wherein the radial front edge refers to the rotation direction 20.

The initial cutting portion 5* facilitates that the blade 3 that rotates in the rotation direction 20 can already have a very small distance between the strand and the rotation axis 3' of the blade when entering the strand 100 that is to be cut up as will be illustrated infra with reference to FIGS. 2a-2h.

Also, the radial rear edge 3b of the residual edge portion 4b that adjoins in the rotation direction 20 to the end of the cutting edge portion 4 is configured differently than in FIG. 1a, namely not as a straight line which is oriented at a particular angle to the rear defining radius 5.2 of the circular segment 5, but in this case as a concave cambered line.

Also, other configurations would be possible with the goal to make the angle between the rear defining radius 5.2 of the circular segment 5 and the radially outer beginning of the radial rear edge 3b as small as possible in particular to reach 0°.

Thus, the blade 3 moves more quickly out of the overlap with the meat strand to be cut into slices during cutting operations as will be described infra.

Namely FIGS. 2a-2h show the blade 3 according to the first embodiment of FIG. 1a in different functional positions while simultaneously cutting of slices 101 from 2 product strands 100 which are arranged adjacent to each other which are respectively moveably supported in the longitudinal direction 10 and respectively completely enclosed in a support tube 16'.

It is appreciated that the longitudinal direction 10' in which the product strands 100 extend and in which the product strand is move able is identical in the case illustrated in the embodiments with the longitudinal direction or axial direction 10 of the rotating blade 3 which corresponds to the direction of its rotation axis 3'. This however does not have to be the case all the time since slices can be cut off from a product strand 100 at a slant angle to the longitudinal direction 10' of the product strand 100.

FIGS. 2a-2h furthermore illustrate a stop plate 13 which is used as a stop for the advanced product strand 100 as illustrated in the side views of FIGS. 3a-3d and which is arranged on a side of the blade plane 3' that is arranged opposite to the form tube 16' and whose distance from the blade plane 3" determines a thickness d of the slice 101 to be cut off.

As illustrated in FIGS. 2a-2h the stop plate 13 is arranged in this case in the longitudinal direction 10, the axial direction of the blade 3 always viewed radially outside the throwing circle 31 of the circular segment 5 and thus of the blade 3 wherein the portion of the circumference of the contact plate 13 that is oriented in this view towards the blade 3 represents its functional edge 13a again which is configured concave with a curvature radius that is slightly greater than the curvature radius 6 of the cutting edge 12' of the cutting edge 12 corresponding to the radial distance between the throwing circle 3.1 and the functional edge 13a, since the curvature center of the functional edge 13a is also the rotation axis 3' of the blade 3.

Cutting the slices 101 off from the product strands 100 that are arranged adjacent to each other is performed by the rotating blade 3 penetrating in the penetration direction 25. In this case transversal, advantageously perpendicular to the longitudinal direction 10 of the cross sections 100" of the meat strands 100, thus the adjacent tubular cavities in the form tube 16', advantageously perpendicular to the connection of the centers of both cross sections 100" of the two tubular cavities 16'a, b in a center.

In the penetration direction 25 the stop plate 13 is in this case fixated at the rotation axis 3' of the blade 3, so that viewed in the axial direction as illustrated in FIGS. 2a-2h a uniform radial edge 26a with constant width is provided between the functional edge 13a and the throwing circle 3.1.

Since not only the stop plate 13 is wide enough in the width direction, thus the offset direction between the two adjacent cavities 16'a, 16'b, in the form tube 16', so that it can cover both cross sections 100" simultaneously, but the blade 3 also has that width a respective slice 101 is simultaneously cut off from both adjacent product strands 100 by the penetration of the blade 3.

Thus, as evident from FIGS. 2a-2h the penetration occurs through the entire cross section 100 of both cavities 16'a, 16'b during less than one revolution of the blade 3, namely while the cutting edge portion 4a runs over both cross sections 100" only a single time.

Figure 2A:
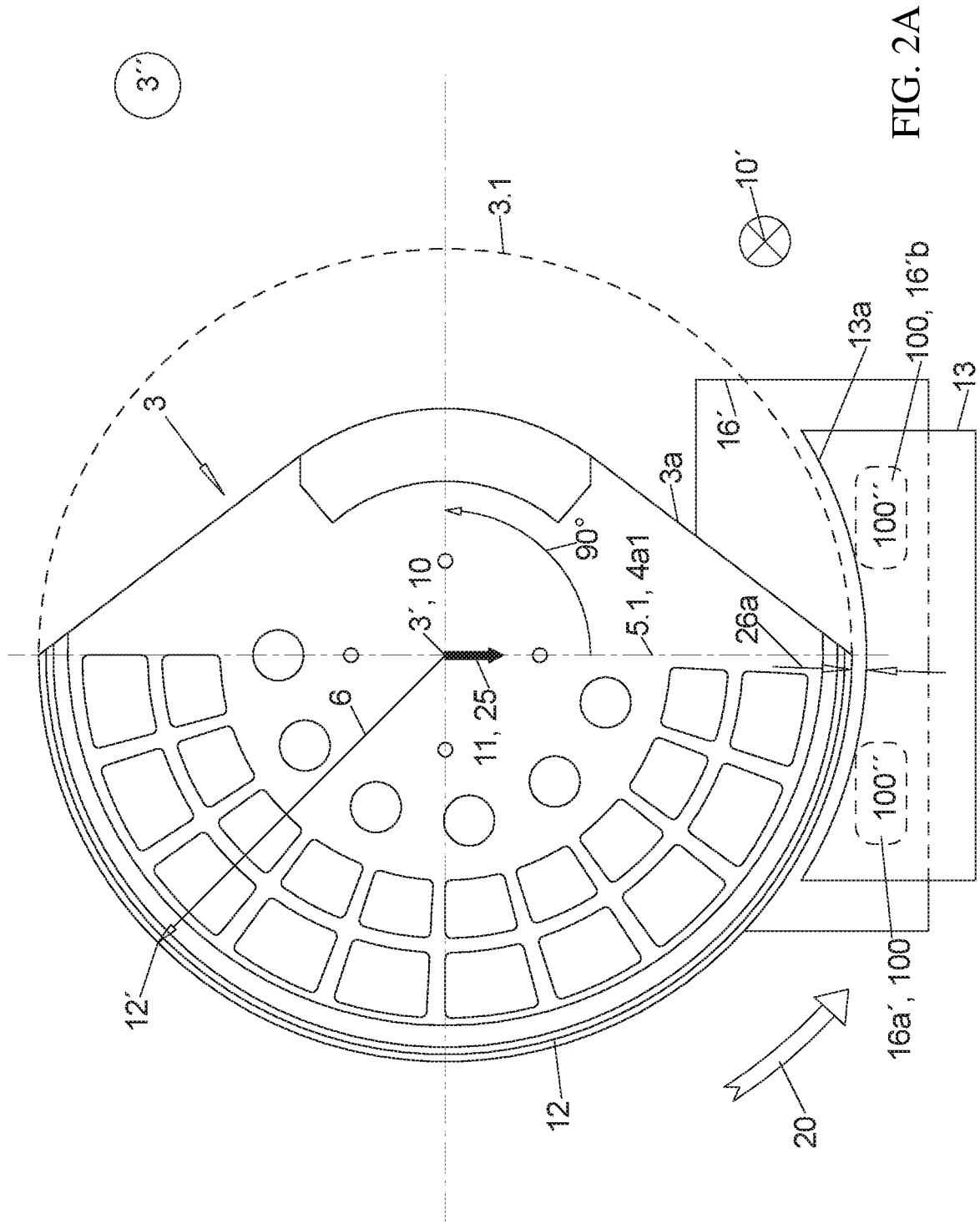
Figure 2B:
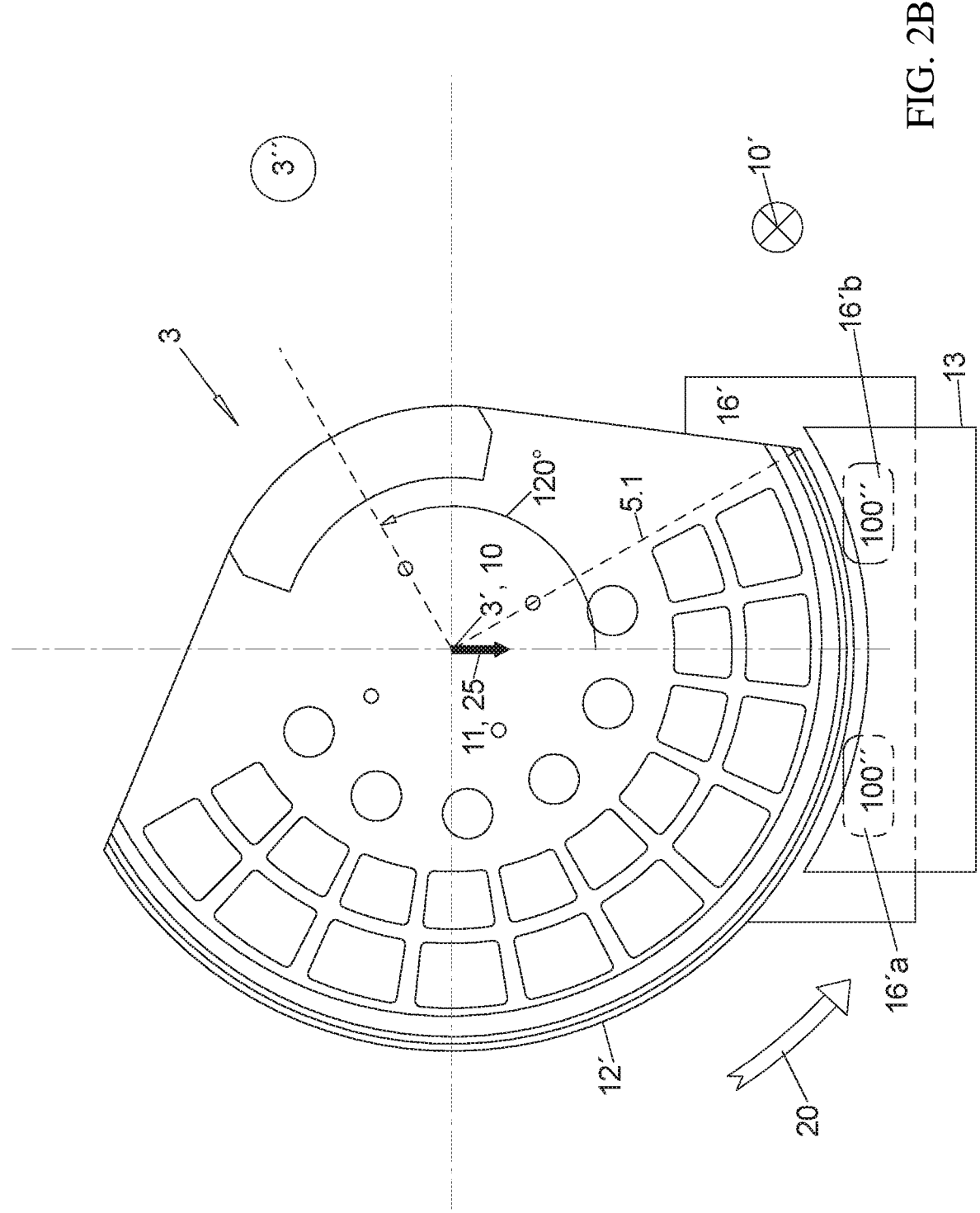
Figure 2D:
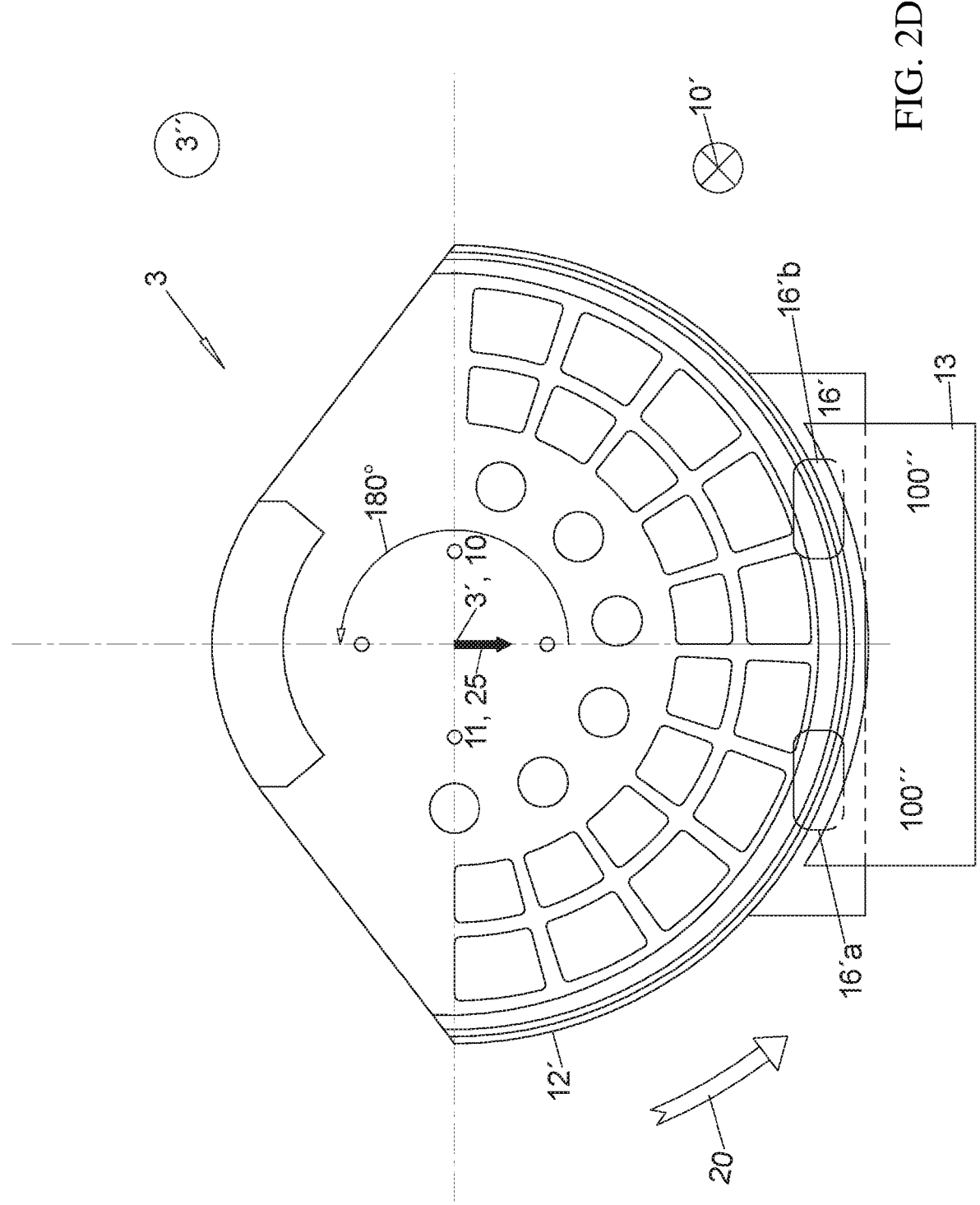
Figure 2E:
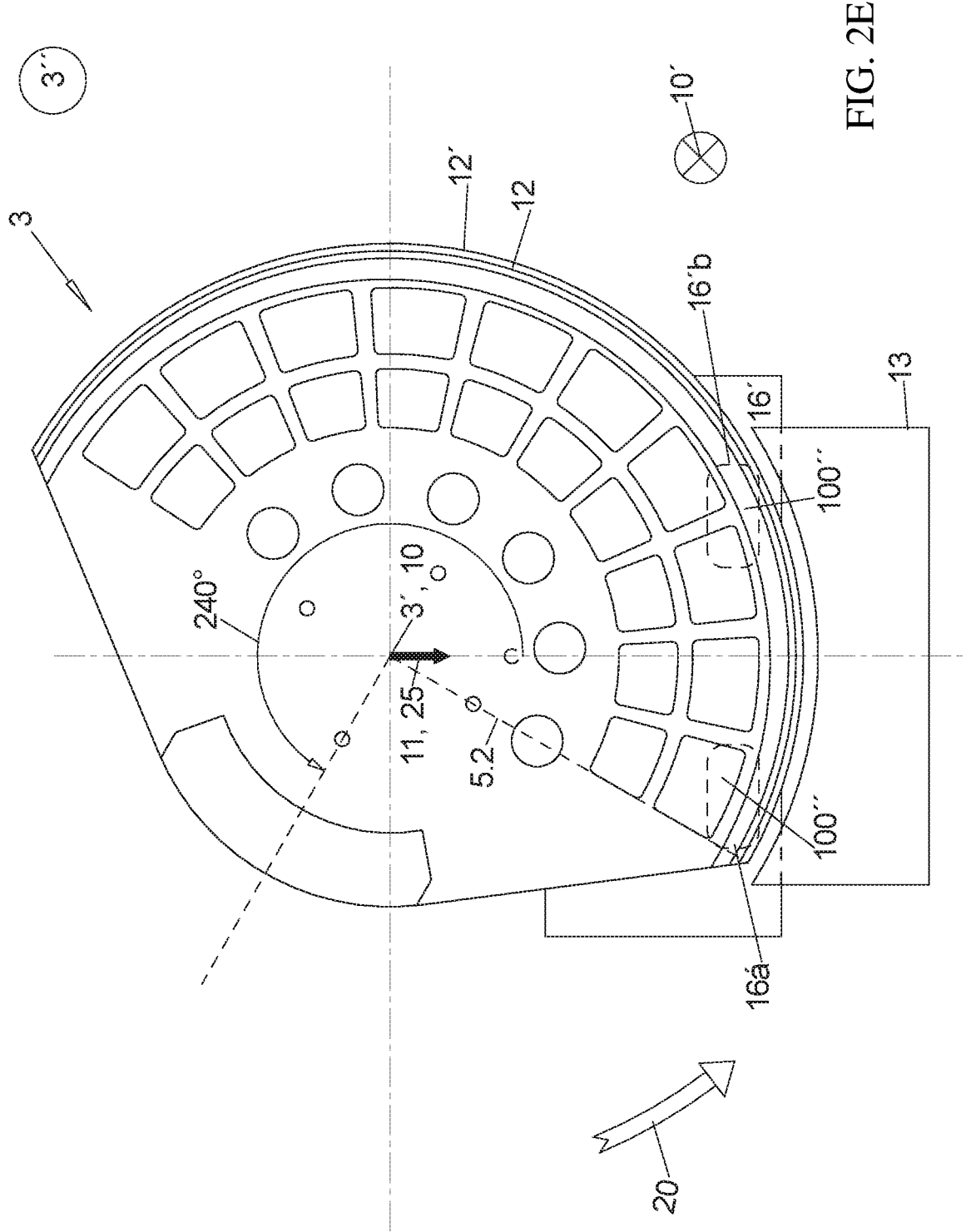
Figure 2F:
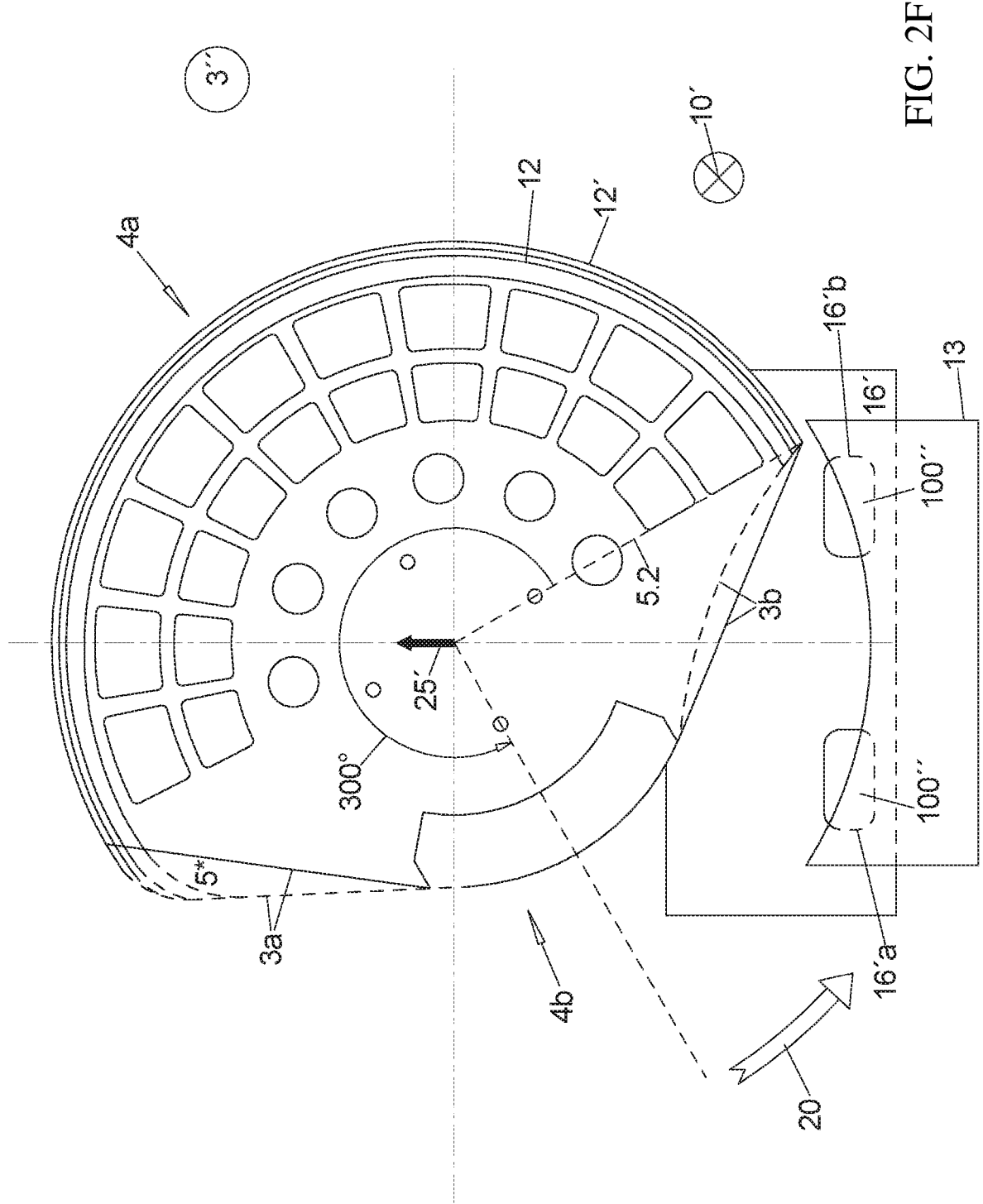
Figure 2G:
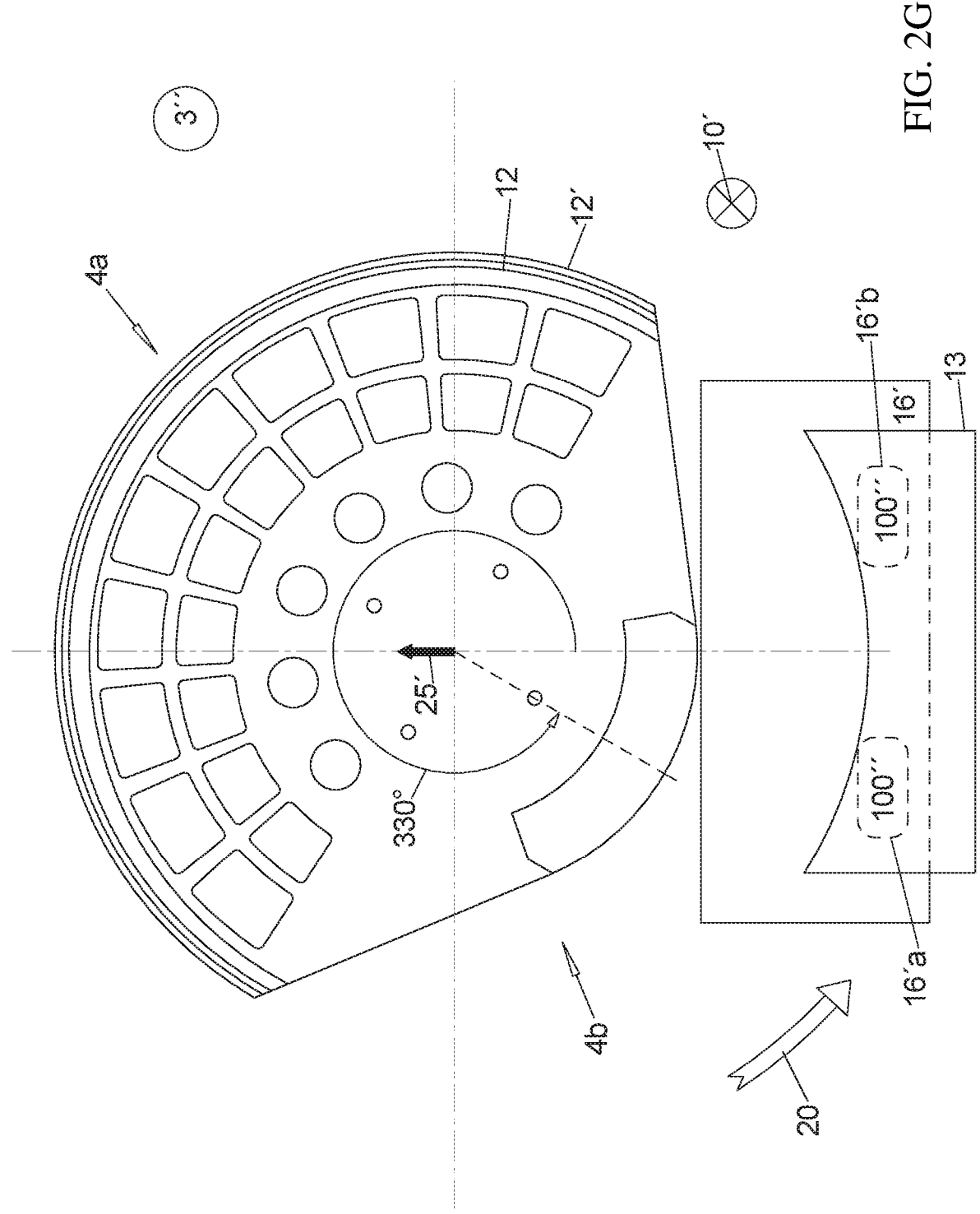
Figure 2H:
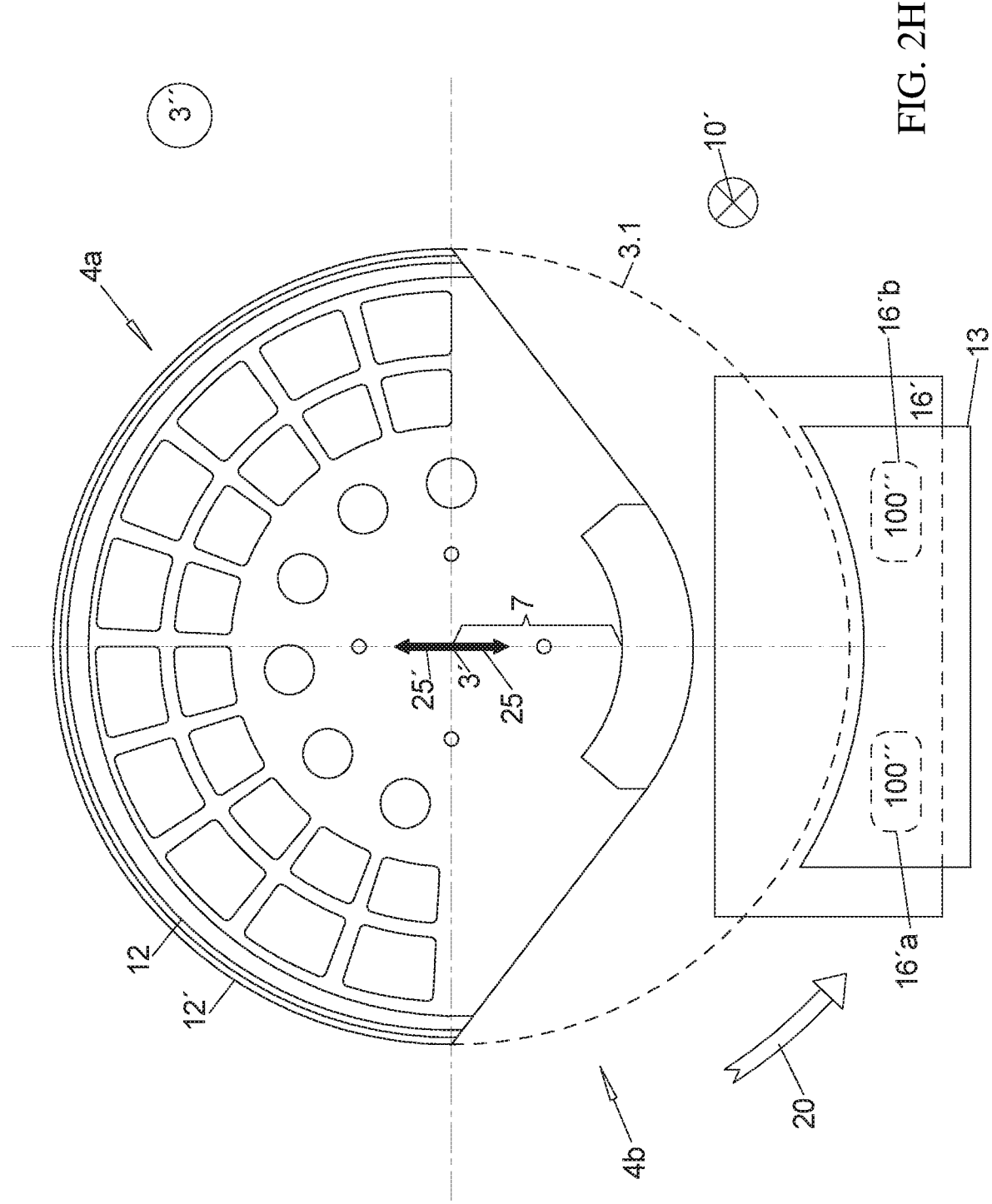

With respect to the rotation position of the blade 3, as illustrated in FIG. 2h a position is considered a starting position where a point of the circumference of the blade 3 which has a smallest distance 7 from the rotation axis 3' is in front in the penetration direction 25, thus oriented towards the form tube 16' and its cavities 16'a, b.

The rotation direction 20 of the blade is counter clock wise in the instant case.

In this starting position the stop plate 13 covers the cross section 100" of both cavities 16'a, b completely and accordingly neither the blade 3 nor its throwing circle 3.1 covers these cross sections 100" nor thus its throwing circle 3.1 extend through these cross sections 100".

From this starting position the blade 3 continues to rotate in the rotation direction 20 and approaches the cross sections 100" in the penetration direction 20 and thus approaches the product strands 100.

FIG. 2a illustrates the condition after a rotation of the blade 3 of 90° from the starting position.

Thus, not only the blade 3 but also the stop plate 13 has moved downward synchronously in the penetration direction 25 so that the stop plate 13 only covers the cross sections 100", but the functional edge 13a of the stop plate 13 already has reached the edge of the cross sections 100".

The forward defining radius 5.1 has already run over the first cross section 16' a in the rotation direction 20 but has not passed the second cavity 16'b and the throwing circle 3.1 of the blade 3 still has a radial distance from the cross sections 100".

FIG. 2b shows the rotational position of the blade 3 move forward by 30° thus at 1200. The rotation axis 3' of the blade 3 has now approached the cross sections 100" of the two meat strands 100 in the penetration direction 25 so that the cutting edge 12 and thus the throwing circle 3.1 has just reached the 2 cross sections 100" which are not covered completely by the stop plate 13 anymore now due to the radial gap 26a viewed in the feed direction 10.

The forward defining arm 5.1 of the circular segment 5 and thus in this case of the cutting edge portion 4a has just passed the second cavity 16'b in the rotation direction 20.

When the blade 3 rotates further and increases its penetration in the penetration direction 25 into the cross sections 100" as evident from FIG. 2c at 150°, FIG. 2d at 180° the blade edge 12, thus its cutting edge 12a of the blade 3 cuts more and more through the cross sections 100" and has cut them apart completely at an angular position of 240° (FIG. 2e).

Thus, a rear defining radius 5.2 of the circular segment 5 is in the rotation direction 20 still behind the cross sections 100" thus has not reached them completely yet.

The position according to FIG. 2e when the cutting edge 12' of the blade edge 12 has just cut through both cross sections 100" which should be the case simultaneously since the 2 cross sections 100" should be arranged symmetrical to the penetration direction 25 and the rear defining radius 5.2 of the circular segment 5 has not reached the cross sections 100" yet and the stop plate 13 does not cover the cross sections 100" anymore the maximum represents the maximum penetration position of the blade 3 in the penetration direction 25 and its rotation axis 3'.

From this position the blade 3 is rotated forward but pulled back again in the radial direction against the penetration direction 25, namely in the pullback direction 25'.

As illustrated in FIG. 2f for an angular position of 300°.

The rear defining radius 5.2 has thus already passed over both cross sections 100" in the rotation direction 20 and the stop plate 13 has already moved far enough in the retraction direction 25' so that it already covers the cross sections 100" partially again.

Though the throwing circle 3.1 still extends through the cross sections 100" moving the product strands 100 that are received in the tubular cavities 16a, b in a direction towards the stop plate 13 can already be commenced in this position since the blade 3 does not cover the cross sections 100" with the product strands 100 anymore which simultaneously form the cross sections of the cavities 16a, b due to the fact that also the radial rear edge 3b of the residual edge portion 4b which adjoins the rear end of the cutting edge portion 4a in the rotation direction 20 has already run over both cross sections 100".

From this position as illustrated e.g. according to FIG. 2g at 330° the blade 3 is moved in the pullback direction 25' further away from the cross sections 100" and rotated forward until the starting position according to FIG. 2h is reached after another 30°.

FIG. 2f also indicates with the dashed contour of the second blade embodiment according to FIG. 1b that moving the strands 100 forward can be performed slightly earlier when the radial rear edge 3b of the residual edge portion 4b releases the cross section of the second cavity 16' b even earlier due to a corresponding concave configuration, then for the blade configuration according to FIG. 1a.

By the same token FIG. 2f indicates based on the dashed radial front edge 3a of the blade shape according to FIG. 1b that the blade 3 can only enter the first cavity 16'a at a larger rotation angle than for the blade shape according to FIG. 1a when the front end of the circular segment 5 is adjoined by an initial cutting portion 5\* with a radially inward receding cutting edge 12'.

Figure 4:
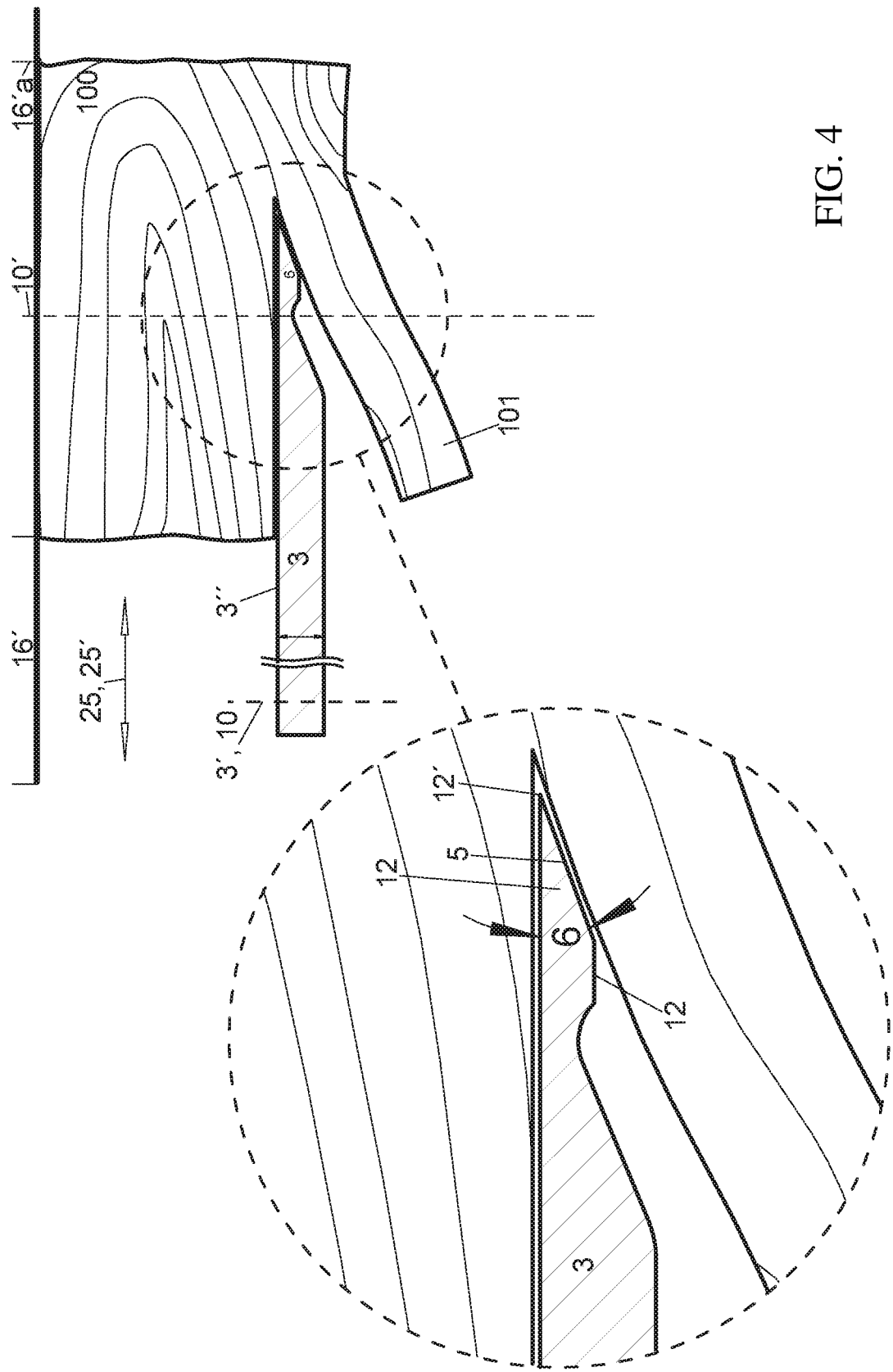
FIG. 4 illustrates an axial sectional view of a slice that is already cut off from a strand.

FIG. 4 illustrates an enlarged representation of a sectional view through a blade 3 that has already penetrated into the product strand 100 partially so that the generated slice 101 is already partially cut off from the product strand 100.

Thus, it is visible quite well that the plate shaped base element of the blade 3 is only ground on one side, thus on a side that is oriented away from the meat strand 100 so that a back side of the blade 3 that is oriented towards the meat strand 100 represents the blade plane 3' along which the cutting process is performed.

FIG. 4 illustrates in particular in the enlarged view that the slanted surface of the blade edge 12 does not extend from the cutting edge 12' continuously to a full thickness of the plate shaped base element of the blade 3 but that a fillet can be configured there between in cross section and in particular between the fillet and the slanted surface of the blade edge 12 that extends away from the cutting edge 12' a saddle can be provided in the cross section of the blade edge 12, wherein the saddle extends in particular parallel to the back side of the blade 3.

Advantageously the saddle as well as the fillet extends in the circumferential direction along the cutting edge 12, in particular along the entire circular segment 5 of the blade edge 12. This reduces adhesion of the blade 3 at the product to be cut.

FIGS. 3a-3d illustrate different functional positions of the cutting unit 1 including the blade 3 and the stop plate 13 in the side view, thus transversal to the penetration direction 25 and to the axial direction 10, the direction of the rotation axis 3' on the other hand side.

Thus, it is evident that the product strand 100 is pushed forward in the tubular cavity, e.g., 16'b, of the form tube 16' which is at least open in front wherein the product strand is moved at a lower contact surface 16a by a strand slide 17 that is driven by a strand drive 19 wherein the product strand is moved from its rear end in the feed direction 10a respectively to the stop against the back side of the stop plate 13 which is then arranged in the axial direction 10 which is in this case also the rotation axis 3 of the blade and the feed direction 10' of the strand 100 at a distance in front of the form tube 16' and in front of the blade plane 3' which extends at a minimum distance barely not touching in front of the forward face of the form tube 16' and thus is arranged with an axial gap 26b from the blade 3 wherein the gap defines the thickness d of the slice 101 that is to be cut off.

Gripper instruments 21 can be provided at a front end of the strand slide 17 wherein the gripper instruments support a rear end of the product strand 100 and prevent it from lifting off from the front surface of the strand slide 17.

In order to cut off the slice 101 the rotating blade 3 moves as illustrated with reference to FIGS. 2a through 2h with its rotation axis 3' in the penetration direction 25, thus in a direction of the at least one meat strand 100 (FIG. 3a) that protrudes in the feed direction 10' from the form tube 16' and penetrates the cross-section of the meat strand (FIG. 3b) and thus increasingly separates the portion of the product strand 100 that protrudes from the form tube 16' as a slice 101 which then slides through the gap 26 between the blade 3 and the functional edge 13a of the stop plate 13.

When the blade edge 12 of the blade 3 has cut through the product strand 100 completely, the cut off slice 101 flips downward over the functional edge 13a of the stop plate 13 oriented towards the blade due to the forward downward slope of the form tube 16' and drops onto a non-illustrated placement surface or an extraction conveyor.

As soon as complete separation of the product strand 100 is performed, the blade 3 lifts in the axial direction 10 in a lifting movement 27a further away from the forward face of the form tube 16' and performs a retraction movement 25' against the penetration movement 25 subsequently or simultaneously.

Figure 3A:
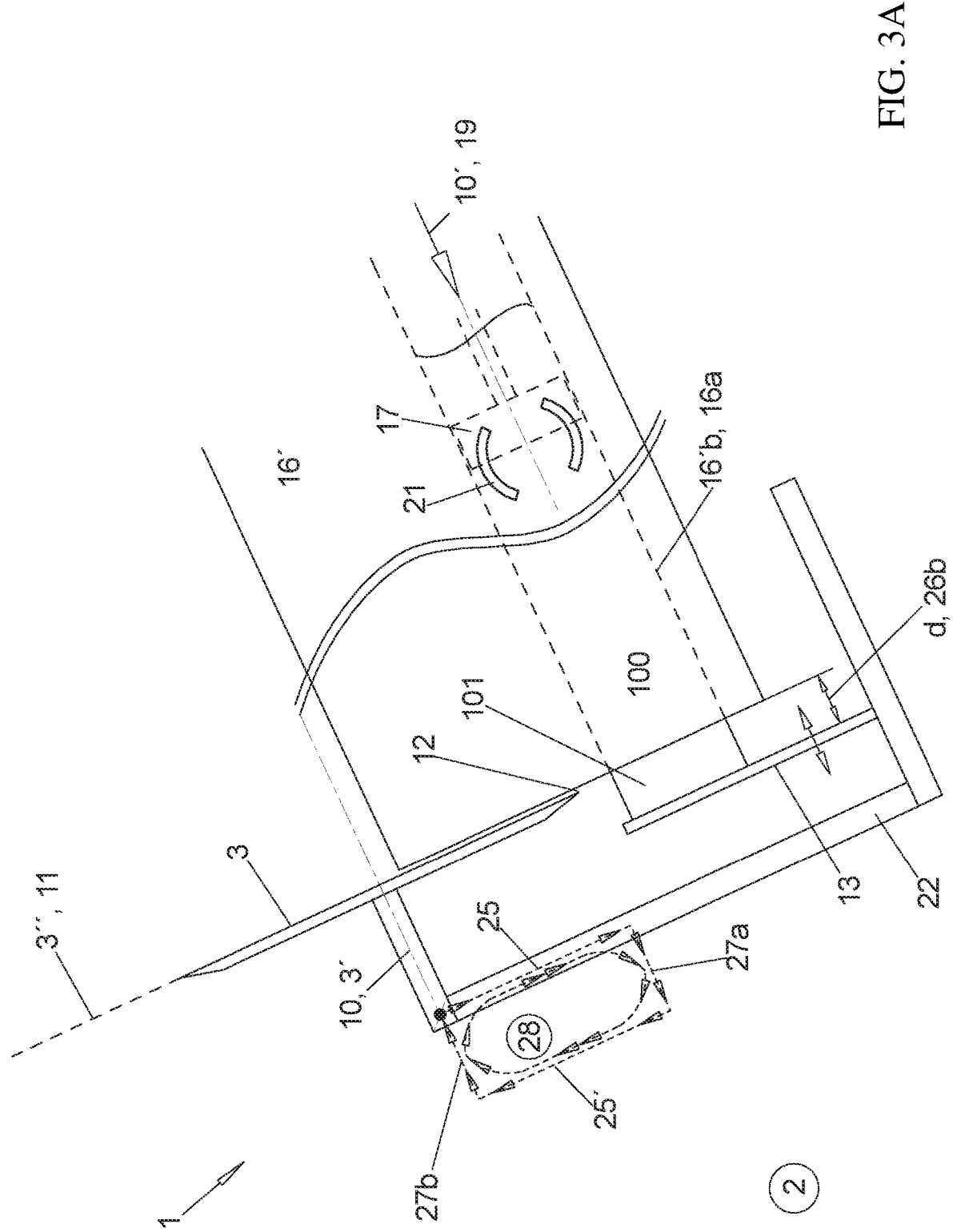
FIGS. 3a-3d illustrates a longitudinal sectional view through a strand showing the cutting unit in different functional positions while cutting off a slice.
Figure 3B:
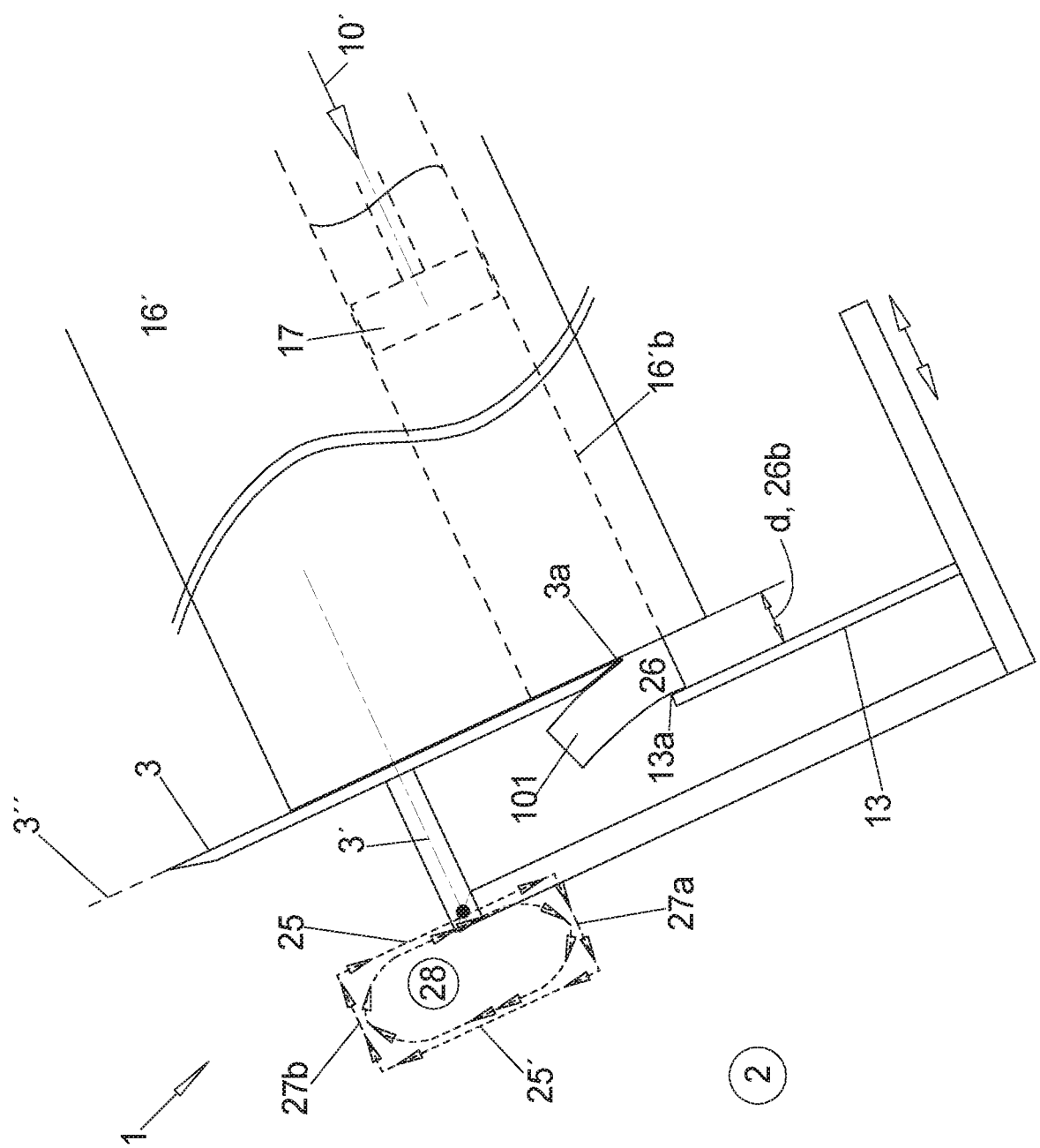
Figure 3C:
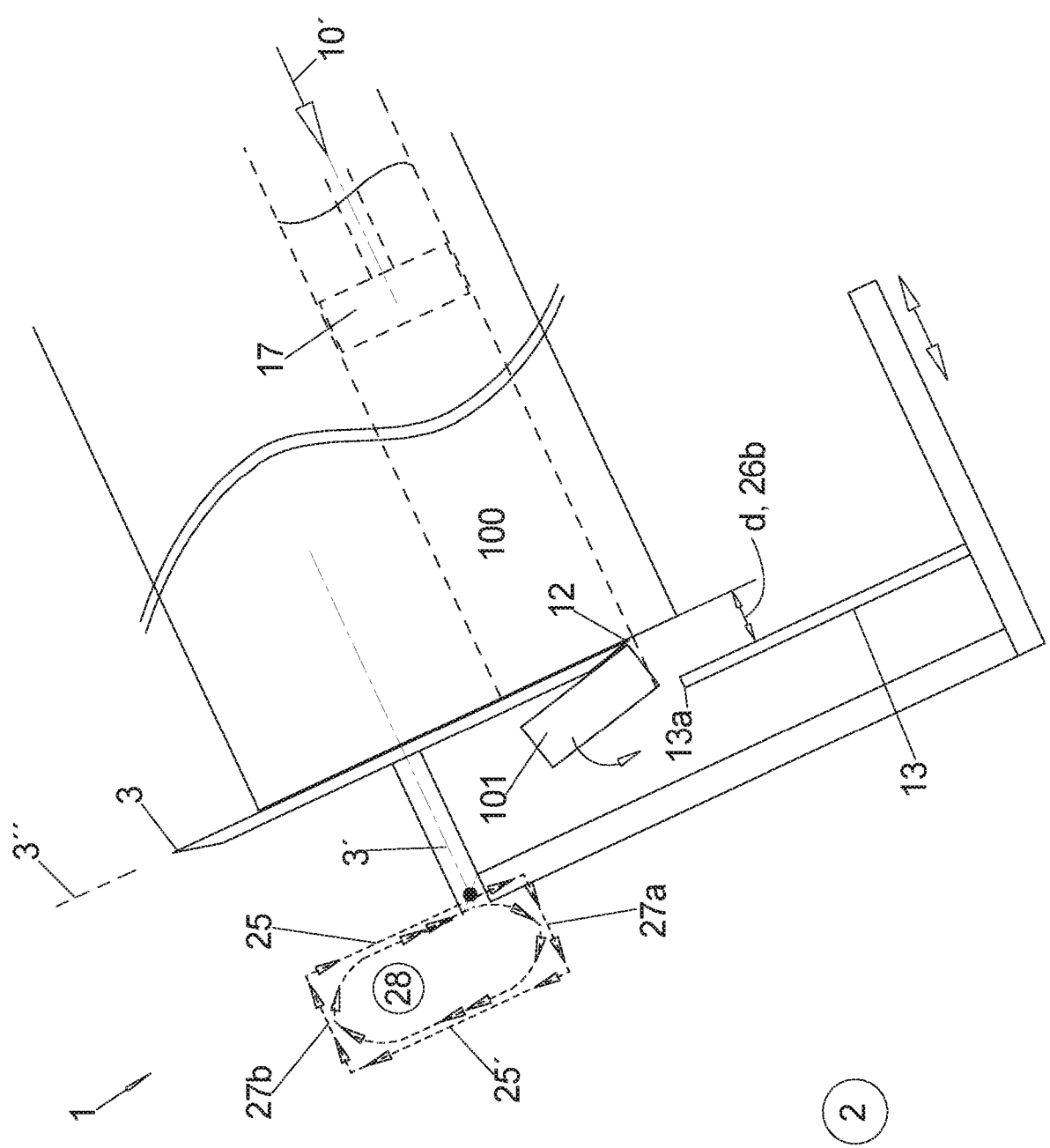
Figure 3D:
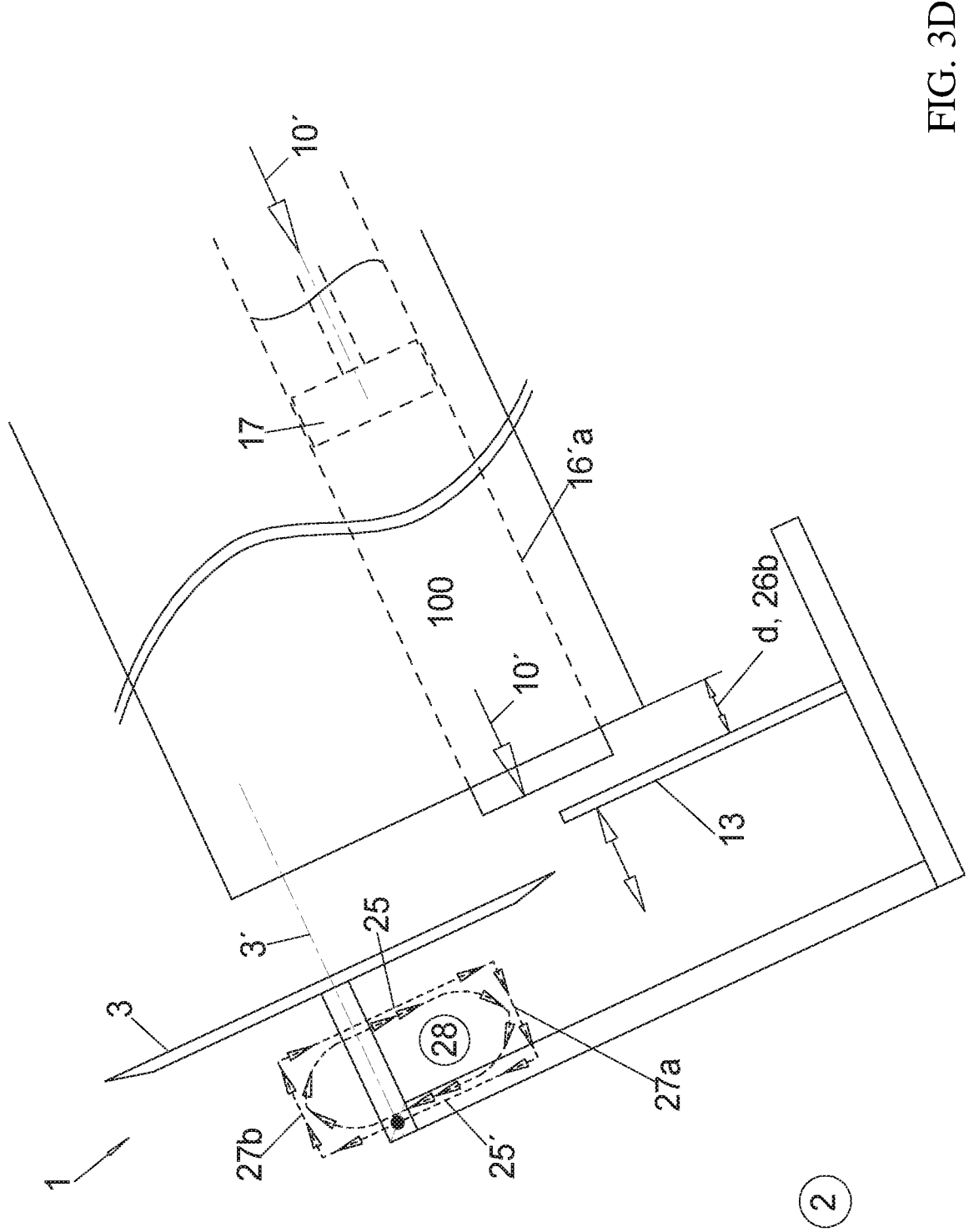

As illustrated in FIG. 3d, this facilitates that the strand 100 can already be moved further forward beyond the front end of the form tube 16' when the lift off movement 27a has commenced.

During or after completing the retraction movement 25' the blade 3 is moved against the feed direction 27a axially in the contact direction 27b, thus in the longitudinal direction 10 towards the form tube 16' until the blade 3 has reached the starting position according to FIG. 3a.

Thus, the blade 3 performs an annular closed, for example rectangular or oval, orbital movement 28 which facilitates an earlier beginning of the feed movement of the meat strand 100 after cutting off each slice 101 in the side view and thus idle times between two cutting processes are reduced.

This lift off movement 27a and thus the orbital movement 28, however, is advantageously not performed synchronously by the stop plate 13 but the stop plate 13 moves together with the blade 3 advantageously synchronously only in the penetration direction 25 and in the retraction direction 25' since the stop plate already has to be available as a stop for the advanced meat strand 100 during the lift off movement 27a and in particular during the contact movement 27b.

In FIGS. 3a through 3d the blade 3 is attached at a cutting frame 22 wherein the blade 3 is received in the cutting frame 22 so that the blade is rotatable about its rotation axis 3' wherein the cutting frame is a component of the cutting unit 1 which is moveably attached at a base frame 3 that is symbolized by the drawing plane. Thus, not only the blade 3 but advantageously the entire cutting frame 22 performs the described orbital movement 28.

When the stop plate 13 is attached at the cutting frame 22 as illustrated, the stop plate has to be movable to the cutting frame 22 in the axial direction 10 also during the individual cut off processes, not only before a beginning of a slicing process.

For this purpose, a corresponding drive and a corresponding control are provided.

REFERENCE NUMERALS AND DESIGNATIONS

1 Cutting unit
2 Base frame
3 Blade
3a Radial front edge
3b Radial rear edge
3.1 Throwing circle
3' Rotation axis
3" Blade plane
4 Outer edge
4a Cutting edge portion
4a1 Forward defining radius
4a2 Rear defining radius
4b Remaining edge portion
5 Circular segment
5.1 Forward defining radius
5.2 Rear defining radius
5' Curvature center
6 Curvature radius
7 Radial distance
8 Portion with increased surface weight
9 Symmetry line, diameter line
10 Axial direction, longitudinal direction
10' Feed direction, longitudinal direction of the feed device
11, 11' Transversal direction
12 Blade edge
12' Cutting edge
13 Stop plate
13a Circumferential portion functional edge
14 Thickness distance
15 Feed arrangement
16 Strand support
16a Contact surface
16' Support tube
16'a, b Cavity
17 Strand slide
18 Additional weight
19 Strand drive
20 Rotation direction
21 Gripper
22 Cutting frame
23 Recess
24 Pass-through borehole
25 Penetration direction, penetration movement
25' Retraction direction, retraction movement
26 Gap
26a Radial gap
26b Axial gap
27a Lift off direction, lift off movement
27b Contact direction, contact movement
28 Orbital movement
100 Product strand
100" Strand cross-section
101 Slice
d Thickness

The invention claimed is:

1. A method for cutting slices from a front end of a feedable product strand using a rotatable plate-shaped blade that is rotatable 360 degrees about a rotation axis, wherein an outer edge of the blade viewed in a direction of the rotation axis includes a circular segment about the rotation axis, wherein the outer edge of the blade comprises a cutting edge portion within the circular segment, and wherein the circular segment defines a throwing circle, the method comprising:

feeding the product strand beyond a plane of the blade until it contacts a stop plate after cutting off a slice and after a radial rear edge in a rotation direction of the circular segment of the blade has left a cross section of the product strand and before the throwing circle of the circular segment of the blade has left the cross section, and until a radial front edge in the rotation direction of the circular segment of the blade penetrates the cross section of the product strand again;

wherein the cutting edge portion has an arc length defined by a first end and a second end of the cutting edge portion, and the cutting edge portion is positioned at a first radial distance from the rotation axis along the arc length, wherein the cutting edge portion including the first and second ends thereof defines the throwing circle as the blade rotates about the rotation axis, wherein the outer edge of the blade further comprises a non-cutting residual edge portion that extends continuously from the first end of the cutting edge portion to the second end of the cutting edge portion in a convex or approximately triangular shape oriented away from the cutting edge portion, and wherein the entire residual edge portion of the outer edge is disposed radially inward of the throwing circle.

2. A cutting unit for cutting slices from a product strand, the cutting unit comprising:

a blade having a substantially planar shape and being rotatable 360 degrees about a rotation axis, wherein an outer edge of the blade is configured as a blade edge over a cutting edge portion, the cutting edge portion having an arc length defined by a first end and a second end of the cutting edge portion, and the cutting edge portion being positioned at a first radial distance from the rotation axis along the arc length, and wherein the cutting edge portion including the first and second ends thereof defines a throwing circle as the blade edge rotates about the rotation axis, and the blade further includes a non-cutting residual edge portion of the outer edge that extends continuously from the first end of the cutting edge portion to the second end of the cutting edge portion in a convex or approximately triangular shape oriented away from the cutting edge portion, wherein the entire residual edge portion of the outer edge is disposed radially inward of the throwing circle.

3. The cutting unit according to claim 2, wherein the rotation axis of the blade is identical with a curvature center of the arc length of the cutting edge portion.

4. The cutting unit according to claim 2, wherein the arc length of the cutting edge portion corresponds to at most a 280 degree rotation of the blade.

5. The cutting unit according to claim 2, wherein the residual edge portion is defined by a second radial distance from the rotation axis proximate the second end of the cutting edge portion at a transition area between the residual edge portion and the cutting edge portion and a third radial distance from the rotation axis in a middle portion of the residual edge portion, and wherein the second radial distance is greater than the third radial distance and the radial distance continuously decreases from the transition area to the middle portion of the residual edge portion.

6. The cutting unit according to claim 2, wherein the blade has substantially identical centrifugal force in opposite radial directions in a rotating condition along a symmetry line that extends through the rotation axis.

7. The cutting unit according to claim 2, wherein the blade edge comprises a plate edge on one side of a blade plane of the blade and a bevel that is ground on a second side of the blade plane to form a slanted surface that extends away from the blade plane.

8. The cutting unit according to claim 2, further comprising:

a base frame provided at which the rotation axis of the blade is arranged movable in a transversal direction that is orthogonal to the axial direction, and the blade is rotatably supported in a cutting frame that is arranged in the base frame so that the blade is movable in the transversal direction.

9. The cutting unit according to claim 2, wherein the cutting unit includes a stop plate that is fixed in a position relative to the rotation axis;

the stop plate has a circumferential portion that extends at least partially radially outside of the throwing circle;

a contact surface of the stop plate is arranged either parallel to a blade plane of the blade or identical to the blade plane;

the rotation axis and the stop plate are attached to a cutting frame of the cutting unit; and the cutting frame is disposed for movement relative to a base frame of the cutting unit during a cutting operation so that the blade and the stop plate are movable in a direction transverse to the rotation axis during the cutting operation.

10. The cutting unit according to claim 9, wherein the circumferential portion of the stop plate is oriented towards the rotation axis and defines a concave surface that is complimentary to the blade edge over the cutting edge portion of the blade, the stop plate is disposed to define an axial gap relative to the blade plane of the blade, wherein the axial gap is adjustable and defines a thickness of a slice that is to be cut off from a product strand.

11. The cutting unit according to claim 9, wherein at least one transition area at one of the first or second end of the cutting edge portion is defined by a second radial distance from the rotation axis that is smaller than the first radial distance from the rotation axis, and wherein the second radial distance decreases towards the at least one transition area at the one of the first or second end of the cutting edge portion, and wherein the circumferential portion of the stop plate is configured as a concave circular segment.

12. The cutting unit according to claim 9, wherein the blade is only ground and beveled on a side of the blade that is oriented towards the stop plate.

13. The cutting unit according to claim 2, wherein the cutting unit includes a stop plate that has one of a position that is adjustable relative to the rotation axis of the blade in a transversal direction, or a position that is fixed relative to the rotation axis at least during operations of the cutting unit, wherein the transversal direction is a linear direction transverse to a feed direction of a product strand when the product strand is being sliced by the cutting unit.

14. The cutting unit according to claim 13, wherein the stop plate is movable with the rotation axis of the blade in the transversal direction during a cutting cycle of the cutting unit.

15. The cutting unit according to claim 13, wherein the rotation axis of the blade and the blade are movable in the transversal direction between a product strand cutting position and a product strand feed position so that (a) the blade can at least partially cover a cross section of a cavity of a support tube in the product strand cutting position, and (b) does not overlap with the cross section of the cavity of the support tube when the blade is in the product strand feed position.

16. The cutting unit according to claim 15, wherein the stop plate is movable in the transversal direction so that (a) the stop plate at least partially overlaps the cross section of the cavity of the support tube when the blade is in the product strand cutting position, and (b) the stop plate at least partially overlaps the cross section of the cavity of the support tube when the blade is in the product strand feed position.

17. The cutting unit according to claim 2, wherein the cutting unit includes a strand support for supporting the strand and a strand drive for moving the product strand along the strand support in a feed direction towards the blade, and wherein the strand support is attached to the base frame.

18. The cutting unit according to claim 17, wherein the strand support includes at least one contact surface that extends in the feed direction, wherein the contact surface comprising a support tube with at least one cavity that is circumferentially closed and at least open at a front end of the cavity, and the strand support terminates at the front end in the feed direction proximate the blade wherein the front end is arranged opposite to the stop plate and the strand support extends away from the blade toward a rear end of the strand support.

19. The cutting unit according to claim 17, wherein the strand drive includes a strand slide that is movable in a linear manner in the feed direction, the strand slide includes a plurality of grippers for gripping and retaining the product strand at a position near the blade.

20. A cutting unit for cutting slices from a product strand, the cutting unit comprising:

a blade being a substantially planar plate and being rotatable 360 degrees about a rotation axis, wherein an outer edge of the blade comprises a cutting edge portion, the cutting edge portion having an arc length defined by a first end and a second end of the cutting edge portion, and the cutting edge portion positioned at a first radial distance from the rotation axis along the arc length, wherein the cutting edge portion including the first and second ends thereof defines a throwing circle as the blade rotates about the rotation axis, wherein the outer edge further comprises a non-cutting residual edge portion that extends continuously from the first end of the cutting edge portion to the second end of the cutting edge portion in a convex or approximately triangular shape oriented away from the cutting edge portion, and wherein the entire residual edge portion of the outer edge is disposed radially inward of the throwing circle.

21. The cutting unit according to claim 20, further comprising a stop plate having a position that is fixed relative to the rotation axis of the blade at least during a cutting operation of the cutting unit, wherein the rotation axis of the blade and the stop plate are moveable together in a transversal direction during the cutting operation of the cutting unit, and wherein the transversal direction is transverse to a feed direction of a product strand when the product strand is being sliced by the cutting unit.

22. The cutting unit according to claim 21, wherein the blade is rotatable between a feed position and a maximum penetration position during operation of the cutting unit so that (a) the blade entirely overlaps a cross section of a cavity of a support tube feeding the product strand when the blade is rotated to the maximum penetration position, and (b) the blade does not overlap the cross section of the cavity of the support tube when the blade is rotated to the feed position.

23. The cutting unit according to claim 22, wherein the stop plate is arranged in the longitudinal direction and, after operation of the cutting unit, the stop plate is movable to (a) a first position wherein the stop plate does not overlap the cross section of the cavity of the support tube, and (b) a second position wherein the stop plate at least partially overlaps the cross section of the cavity of the support tube.

24. The cutting unit according to claim 21, wherein the blade is movable between a feed position and a maximum penetration position during operation of the cutting unit and rotation of the blade so that (a) the cutting edge portion of the blade entirely overlaps a first cross section of a first cavity of a first support tube configured to feed a first product strand and the blade entirely overlaps a second cross section of a second cavity of a second support tube configured to feed a second product strand arranged adjacent to the first product strand when the blade is moved to the maximum penetration position, and (b) the blade does not overlap the first cross section of the first cavity of the first support tube and the second cross section of the second cavity of the second support tube when the blade is in the feed position.

* * * * *